US012486812B2

(12) United States Patent
Mercer et al.

(10) Patent No.: US 12,486,812 B2
(45) Date of Patent: Dec. 2, 2025

(54) STANDBY FUEL STORAGE SYSTEM FOR UNINTERRUPTED OPERATION DURING PRIMARY FUEL CURTAILMENT

(71) Applicant: Bedrock Ventures LLC, Edmond, OK (US)

(72) Inventors: Michael D. Mercer, Edmond, OK (US); Ronald R. Mercer, Edmond, OK (US)

(73) Assignee: Bedrock Ventures LLC, Edmond, OK (US)

( * ) Notice: Subject to any disclaimer, the term of this patent is extended or adjusted under 35 U.S.C. 154(b) by 80 days.

(21) Appl. No.: 18/609,934

(22) Filed: Mar. 19, 2024

(65) Prior Publication Data
US 2025/0043739 A1 Feb. 6, 2025

Related U.S. Application Data

(63) Continuation-in-part of application No. 18/391,908, filed on Dec. 21, 2023, which is a continuation of
(Continued)

(51) Int. Cl.
F02D 19/06 (2006.01)
F02D 19/08 (2006.01)
(Continued)

(52) U.S. Cl.
CPC ......... F02D 29/06 (2013.01); F02D 19/0644 (2013.01); F02D 19/0665 (2013.01);
(Continued)

(58) Field of Classification Search
None
See application file for complete search history.

(56) References Cited

U.S. PATENT DOCUMENTS 5,207,530 A * 5/1993 Brooks ............... F17C 1/007
405/53
5,787,940 A 8/1998 Bonn et al.
(Continued)

FOREIGN PATENT DOCUMENTS

CA    2693567 A1 * 10/2010 ............ B67D 7/04
CA    2952043 C  *  7/2019 ............ B65G 5/00
(Continued)

Primary Examiner — Kevin R Steckbauer
(74) Attorney, Agent, or Firm — Hall Estill Law Firm

(57) ABSTRACT

Method and apparatus for standby fuel storage and use to provide uninterrupted power generation by a power generation mechanism. An infrastructure pipeline supplies natural gas at a selected flow rate and a selected pressure as a primary fuel. A secondary fuel is accumulated in a plurality of sub-surface storage pods. In response to an exception event such as a curtailment order, a controller throttles a subsequent flow of the natural gas from the infrastructure pipeline so that the natural gas continues to flow to the power generation mechanism at a reduced flow rate, and blends the reduced flow of the natural gas with the secondary fuel. The secondary fuel can be an additional quantity of natural gas, hydrogen, or some other fuel. Renewable energy sources such as wind or solar can be used to generate the hydrogen, even during the blending process. The blend ratio can be adaptively adjusted.

20 Claims, 11 Drawing Sheets

Related U.S. Application Data application No. 17/949,899, filed on Sep. 21, 2022, now Pat. No. 11,885,270.

(60) Provisional application No. 63/468,558, filed on May 24, 2023, provisional application No. 63/464,643, filed on May 8, 2023, provisional application No. 63/247,022, filed on Sep. 22, 2021.

(51) Int. Cl.
*F02D 29/06* (2006.01)
*F17C 3/00* (2006.01)
*F17C 5/00* (2006.01)

(52) U.S. Cl.
CPC ............ *F02D 19/085* (2013.01); *F17C 3/005* (2013.01); *F17C 5/007* (2013.01); *F17C 2221/012* (2013.01); *F17C 2221/033* (2013.01); *F17C 2223/0123* (2013.01)

(56) References Cited

U.S. PATENT DOCUMENTS

| | | | | |
|---|---|---|---|---|
| 6,890,671 | B2* | 5/2005 | Roche | H01M 8/04089 429/432 |
| 7,128,103 | B2* | 10/2006 | Mitlitsky | H01M 8/04089 141/82 |
| 7,168,464 | B2* | 1/2007 | Diggins | F17C 7/02 141/105 |
| 7,270,209 | B2* | 9/2007 | Suess | B60K 15/03006 224/538 |
| 7,444,189 | B1* | 10/2008 | Marhoefer | H01M 8/0612 700/291 |
| 7,497,191 | B2* | 3/2009 | Fulton | H01M 8/0606 123/492 |
| 7,740,031 | B2* | 6/2010 | Egan | B01F 23/19 141/105 |
| 7,850,034 | B2* | 12/2010 | Munshi | B60K 15/03006 220/560.04 |
| 7,861,696 | B2* | 1/2011 | Lund | F02C 9/40 123/575 |
| 7,966,802 | B2 | 6/2011 | Szepek et al. | |
| 8,091,536 | B2 | 1/2012 | Munshi et al. | |
| 8,301,359 | B1* | 10/2012 | Sagar | G05B 19/042 123/1 A |
| 8,315,788 | B2* | 11/2012 | Surnilla | G01C 21/26 701/123 |
| 8,418,732 | B2* | 4/2013 | Cohen | G05D 11/132 141/94 |
| 8,459,213 | B2* | 6/2013 | Moriarty | B60T 1/10 123/3 |
| 8,469,009 | B2 | 6/2013 | Munshi et al. | |
| 8,583,350 | B1* | 11/2013 | Sagar | G05B 19/042 290/51 |
| 8,613,201 | B2 | 12/2013 | Bayliff et al. | |
| 8,751,140 | B2* | 6/2014 | Surnilla | G01C 21/26 701/123 |
| 9,133,011 | B2* | 9/2015 | McAlister | H01M 8/04753 |
| 9,284,178 | B2* | 3/2016 | Donnelly | B60S 5/02 |
| 9,287,178 | B2 | 3/2016 | Li et al. | |
| 9,309,811 | B2* | 4/2016 | Swann | F02C 9/40 |
| 9,359,568 | B2 | 6/2016 | Bastian et al. | |
| 9,377,202 | B2* | 6/2016 | Menon | F23R 3/36 |
| 9,739,419 | B2* | 8/2017 | Donnelly | B67D 7/04 |
| 9,739,919 | B2 | 8/2017 | Zhang et al. | |
| 9,796,910 | B2 | 10/2017 | Nevison | |
| 9,950,927 | B2* | 4/2018 | Oates | C01B 3/02 |
| 10,145,512 | B2* | 12/2018 | Barker | F17C 5/06 |
| 10,195,583 | B2 | 2/2019 | Constantino et al. | |
| 10,337,669 | B2 | 7/2019 | Mercer et al. | |
| 10,340,693 | B2 | 7/2019 | Lansing et al. | |
| 10,837,601 | B2* | 11/2020 | Mercer | B65G 5/00 |
| 11,220,427 | B2* | 1/2022 | Lugtigheid | C01B 3/065 |
| 11,270,393 | B2* | 3/2022 | Whikehart | G05B 19/4189 |
| 11,525,544 | B2* | 12/2022 | Clarke | H01M 8/04201 |
| 11,680,684 | B2 | 6/2023 | Mercer et al. | |
| 11,681,307 | B1* | 6/2023 | Chedsey | E21B 43/295 137/14 |
| 11,766,944 | B2* | 9/2023 | Van Steenwyk | B60L 50/10 180/65.1 |
| 11,828,417 | B2* | 11/2023 | Clarke | B60L 53/80 |
| 11,852,082 | B2* | 12/2023 | Frey | F02C 9/28 |
| 11,885,270 | B2* | 1/2024 | Mercer | F17C 3/005 |
| 11,927,144 | B2* | 3/2024 | Mercer | F17C 5/007 |
| 11,981,357 | B2* | 5/2024 | Fisher | B61C 17/12 |
| 12,297,965 | B2* | 5/2025 | Thobe | B01F 35/833 |
| 2003/0113602 | A1* | 6/2003 | Nau | B60L 58/30 180/68.5 |
| 2004/0121201 | A1* | 6/2004 | Roche | H01M 8/04089 429/416 |
| 2005/0000802 | A1* | 1/2005 | Hobbs | F17C 9/04 205/637 |
| 2006/0014070 | A1* | 1/2006 | Kaye | H01M 8/04201 429/513 |
| 2006/0033322 | A1* | 2/2006 | Suess | B60K 15/07 280/830 |
| 2006/0071016 | A1* | 4/2006 | Diggins | F17C 7/02 222/3 |
| 2006/0154134 | A1 | 7/2006 | Vinsant | |
| 2006/0263283 | A1* | 11/2006 | Egan | B01F 23/19 423/210 |
| 2008/0057359 | A1 | 3/2008 | Venkataraman et al. | |
| 2009/0005903 | A1* | 1/2009 | Winsness | G06Q 99/00 700/239 |
| 2009/0048716 | A1* | 2/2009 | Marhoefer | H02J 15/008 700/297 |
| 2009/0064586 | A1* | 3/2009 | Munshi | F17C 5/04 48/199 FM |
| 2009/0320789 | A1* | 12/2009 | Lund | F02D 19/0665 123/299 |
| 2010/0000434 | A1* | 1/2010 | Pristash | F42C 11/008 102/200 |
| 2010/0107994 | A1* | 5/2010 | Moriarty | F03G 7/08 310/156.01 |
| 2011/0126545 | A1* | 6/2011 | Loeven, II | F23R 3/36 60/39.281 |
| 2011/0137470 | A1* | 6/2011 | Surnilla | G01C 21/26 700/282 |
| 2012/0004824 | A1* | 1/2012 | Milton | F02D 19/10 701/103 |
| 2012/0079761 | A1* | 4/2012 | Turner | C10L 1/02 44/452 |
| 2013/0008173 | A1 | 1/2013 | Fletcher et al. | |
| 2013/0008557 | A1* | 1/2013 | Cohen | G05D 11/132 141/105 |
| 2013/0112313 | A1* | 5/2013 | Donnelly | F17C 5/06 141/98 |
| 2014/0043932 | A1* | 2/2014 | Russell | C10L 3/10 366/182.4 |
| 2014/0234735 | A1* | 8/2014 | Zhang | C25B 1/04 429/422 |
| 2014/0263401 | A1* | 9/2014 | McAlister | H01M 8/04425 222/23 |
| 2015/0114009 | A1* | 4/2015 | Gates | F25J 1/0022 62/50.1 |
| 2015/0114351 | A1* | 4/2015 | Lund | F02M 43/00 123/457 |
| 2016/0195220 | A1* | 7/2016 | Donnelly | B67D 7/04 141/94 |
| 2016/0354742 | A1* | 12/2016 | Russell | B01F 35/2217 |
| 2017/0174512 | A1* | 6/2017 | Oates | C01B 3/02 |
| 2018/0223746 | A1* | 8/2018 | Mack | G01C 21/166 |
| 2018/0238494 | A1* | 8/2018 | Barker | F17C 5/007 |
| 2019/0106316 | A1* | 4/2019 | Van Vliet | B67D 7/0401 |
| 2020/0055730 | A1* | 2/2020 | Lugtigheid | B67D 7/04 |
| 2020/0259197 | A1* | 8/2020 | Buckenham | H01M 8/12 |
| 2022/0009648 | A1* | 1/2022 | Clarke | B64D 37/06 |
| 2022/0073111 | A1* | 3/2022 | Fisher | B61C 17/12 |
| 2022/0074548 | A1* | 3/2022 | Clarke | B60L 53/80 |
| 2022/0081288 | A1* | 3/2022 | Lugtigheid | B67D 7/04 |
| 2022/0090739 | A1* | 3/2022 | Stager | F17C 7/04 |

(56) References Cited

U.S. PATENT DOCUMENTS

| | | | |
|---|---|---|---|
| 2022/0144103 A1* | 5/2022 | Van Steenwyk | F02B 69/04 |
| 2022/0205590 A1* | 6/2022 | Clarke | B64D 37/16 |
| 2022/0333743 A1* | 10/2022 | Mercer | F17C 13/06 |
| 2023/0086470 A1* | 3/2023 | Mercer | F02D 19/0644 |
| | | | 123/575 |
| 2023/0088217 A1* | 3/2023 | Mercer | F02D 29/06 |
| | | | 141/94 |
| 2023/0178773 A1* | 6/2023 | Wingo | H01M 8/04955 |
| | | | 429/444 |
| 2023/0212990 A1* | 7/2023 | Frey | F23R 3/36 |
| | | | 60/39.281 |
| 2023/0213151 A1 | 7/2023 | Mercer et al. | |
| 2023/0243474 A1* | 8/2023 | Clarke | F17C 1/00 |
| | | | 244/135 R |
| 2023/0246211 A1* | 8/2023 | Montgomery | F02M 21/0206 |
| | | | 429/444 |
| 2023/0250923 A1 | 8/2023 | Mercer et al. | |
| 2023/0383703 A1* | 11/2023 | Neutzler | F02D 19/0628 |
| 2023/0400154 A1* | 12/2023 | Cordova | F17C 7/04 |
| 2023/0407502 A1* | 12/2023 | Joos | C25B 9/70 |
| 2024/0068415 A1* | 2/2024 | Frey | F02C 9/40 |
| 2024/0125277 A1* | 4/2024 | Mercer | F17C 5/007 |
| 2024/0125278 A1* | 4/2024 | Mercer | F02D 19/0665 |
| 2024/0300321 A1* | 9/2024 | Khadiya | B60K 15/03006 |
| 2025/0043739 A1* | 2/2025 | Mercer | F02D 19/0644 |
| 2025/0052379 A1* | 2/2025 | Thobe | B01F 35/2132 |

FOREIGN PATENT DOCUMENTS

| | | | | | |
|---|---|---|---|---|---|
| CN | 212819205 U | * | 3/2021 | | |
| CN | 113864016 A | | 10/2021 | | |
| CN | 114529056 A | * | 5/2022 | | G06Q 10/067 |
| CN | 115325460 A | * | 11/2022 | | F17D 3/01 |
| CN | 217763522 U | * | 11/2022 | | |
| CN | 115796323 A | * | 3/2023 | | |
| EP | 2979743 A1 | * | 2/2016 | | C01B 3/501 |
| EP | 3187459 A1 | * | 7/2017 | | C01B 3/02 |
| EP | 2979743 B1 | * | 10/2019 | | C01B 3/501 |
| ES | 2764389 T3 | * | 6/2020 | | B01D 53/22 |
| JP | 2000017470 A | * | 1/2000 | | |
| JP | 2012082791 A | * | 4/2012 | | |
| JP | 5735252 B2 | * | 6/2015 | | |
| JP | 2021172631 A | * | 11/2021 | | |
| KR | 101825605 B1 | * | 2/2018 | | B63B 25/14 |
| WO | WO-2010122296 A1 | * | 10/2010 | | C10L 1/02 |
| WO | WO-2011050289 A2 | * | 4/2011 | | F03G 7/08 |

* cited by examiner

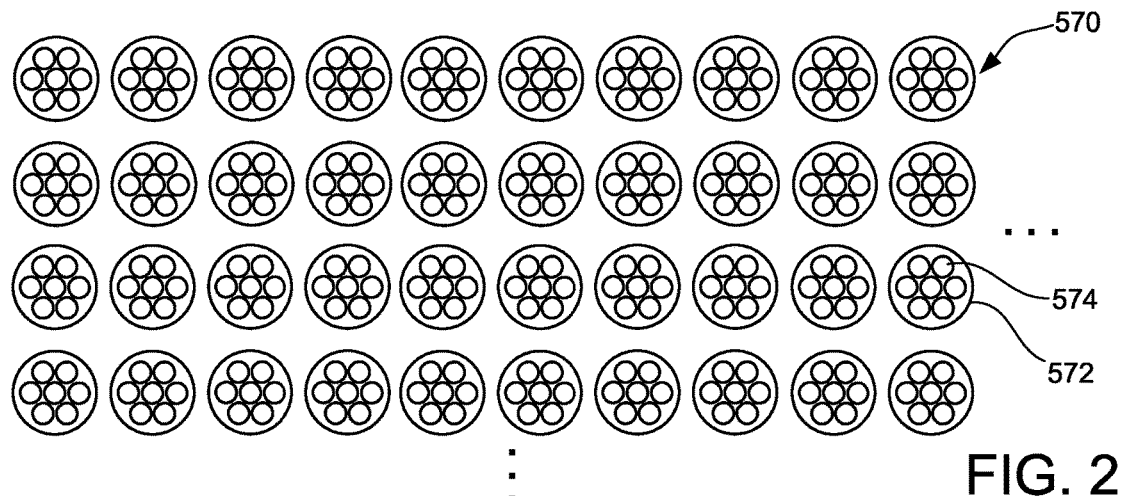
FIG. 20
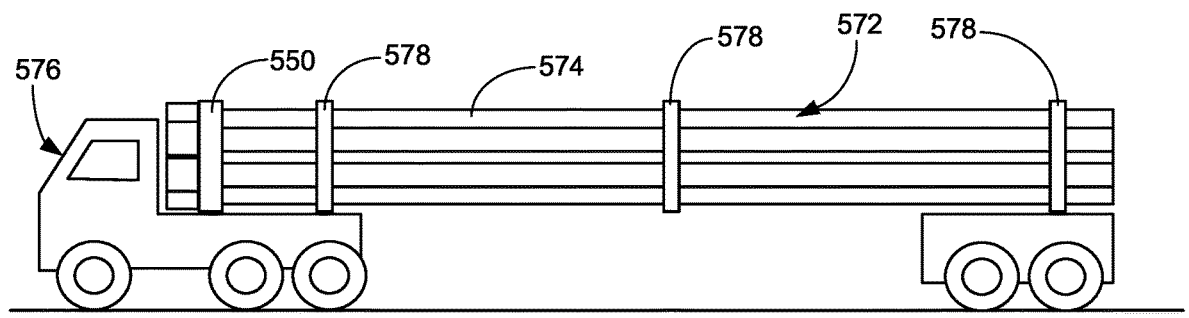
FIG. 21
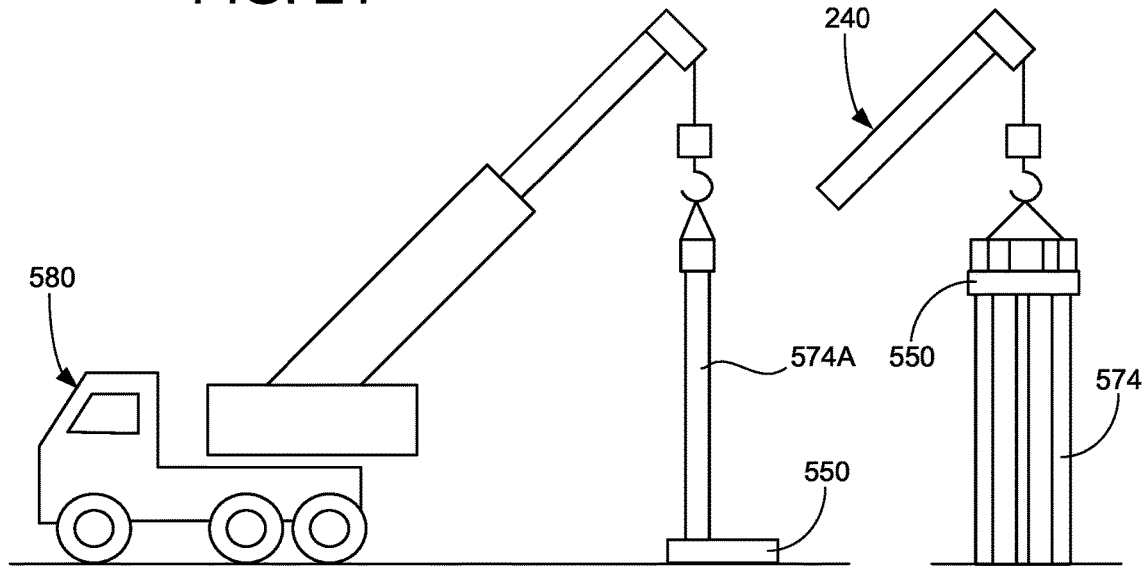
FIG. 22A
FIG. 22B

STANDBY FUEL STORAGE SYSTEM FOR UNINTERRUPTED OPERATION DURING PRIMARY FUEL CURTAILMENT

RELATED APPLICATIONS

The present application is a continuation-in-part of co-pending U.S. patent application Ser. No. 18/391,908 filed Dec. 21, 2023, which in turn is a continuation of U.S. patent application Ser. No. 17/949,899 filed Sep. 21, 2022 and now issued as U.S. Pat. No. 11,885,270, which in turn made a claim of domestic priority under 35 U.S.C. 119(e) to U.S. Provisional Patent Application No. 63/247,022 filed Sep. 22, 2021. The present application further makes a claim of domestic priority to U.S. Provisional Patent Application No. 63/464,643 filed May 8, 2023, and to U.S. Provisional Patent Application No. 63/468,558 filed May 24, 2023. The contents of all of these applications are hereby incorporated by reference.

SUMMARY

Various embodiments of the present disclosure are generally directed to a method and apparatus for blending first and second fuels for use by power generation mechanism, such as a gas turbine.

Without limitation, some embodiments use an infrastructure pipeline to supply natural gas at a selected flow rate and a selected pressure as a primary fuel. A secondary fuel is accumulated in a plurality of sub-surface storage pods. In response to an exception event such as a curtailment order, a controller throttles a subsequent flow of the natural gas from the infrastructure pipeline so that the natural gas continues to flow to the power generation mechanism at a reduced flow rate, and blends the reduced flow of the natural gas with the secondary fuel. The secondary fuel can be an additional quantity of natural gas, hydrogen, or some other fuel. The operation maintains pipeline pressure levels that are at or above curtailment levels. Renewable energy sources such as wind or solar can power an electrolyzer or other equipment to generate the hydrogen, even during the blending process. The blend ratio can be adaptively adjusted.

These and other features and advantages of various embodiments can be understood from a review of the following detailed description in conjunction with a review of the associated drawings.

BRIEF DESCRIPTION OF THE DRAWINGS

FIG. 20 shows aspects of a selected pod farm made up of pods such as in FIG. 18 in further embodiments.

FIG. 21 shows transport of a selected pod in further embodiments.

FIGS. 22A and 22B depict installation and removal of a selected container and a selected pod in further embodiments.

DETAILED DESCRIPTION

Assorted embodiments of the current disclosure are generally directed to a system that intelligently stores and supplies fuels at prescribed pressures and blends to provide optimal fuel usage.

The generation of electricity has evolved with the incorporation of green sources of energy, such as solar, biomass, wind, and tidal harnessing. The electrical grid that delivers power to consumers has similarly evolved with sophisticated pricing and selection models that emphasize the ability of an electrical power generator to provide dynamic output. While operable, these and other advancements have proven to be less robust as compared to traditional systems in the face of disruptions that can be caused by peak demand, weather events and other disruptive conditions.

Accordingly, various embodiments of the present disclosure provide a number of solutions directed to the intelligent storage and use of fuels in the area of electrical power generation. These solutions provide a number of benefits including enhanced system resilience and combustion efficiency.

Figure 1:
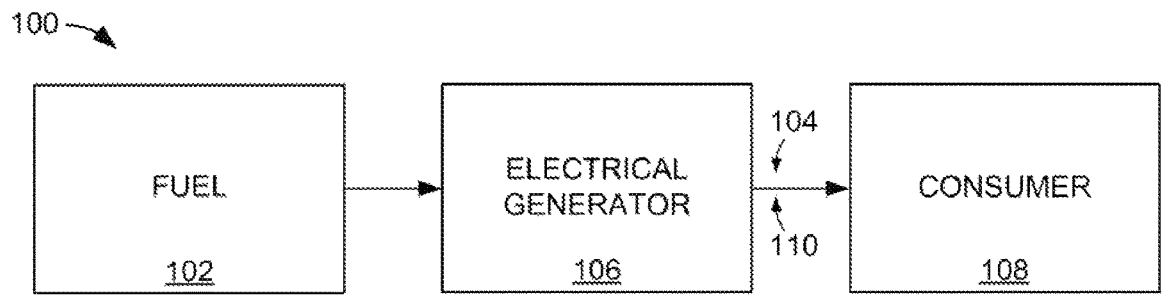
FIG. 1 is a block representation of an example electrical power generation environment in which assorted embodiments can be practiced.

FIG. 1 depicts portions of an example environment 100 in which embodiments of an energy utilization system can be practiced. The delivery of one or more fuels 102, such as coal, natural gas, steam, hydrogen, gasoline, or diesel, allows the conversion of fuel into electrical energy 104 by one or more generators 106. The consistent supply of fuels 102 over time provides electrical power to downstream consumers 108 via an electrical distribution grid 110. However, the cost and supply of fuels 102 can vary over time, which jeopardizes the performance and consistency of electrical energy 104 delivery to consumers 108.

As technology has allowed natural forces with intermittent supply, such as wind, water, and sun, to be converted to electricity, the emphasis on electrical energy 104 generation from combusted, or otherwise consumed, fuels 102 has been reduced. Yet, greater numbers of consumers 108 are connecting to the grid 110 and utilizing greater amounts of electricity, such as to power electrically powered vehicles. It is noted that the supply of blended fuels to an electrical generator is not required or limiting as some embodiments provide blended fuels to a combustion mechanism, such as a vehicle engine or heater.

Figure 2:
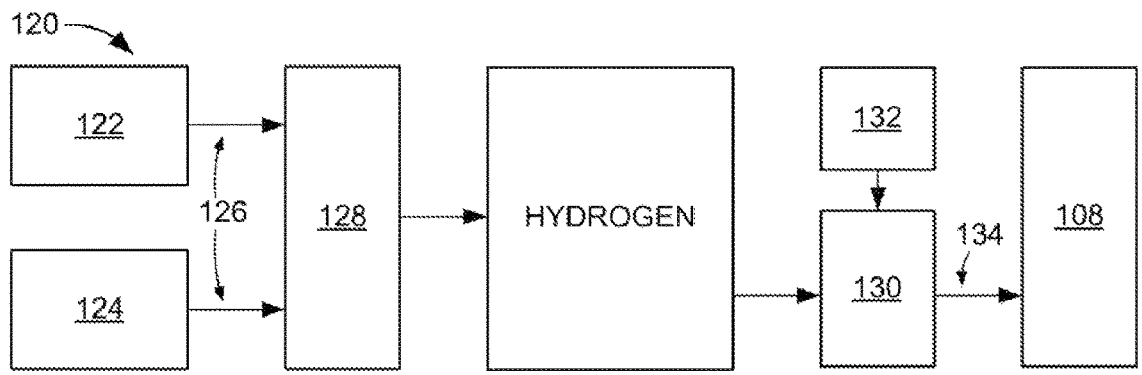
FIG. 2 depicts a block representation of an example electrical power generation system capable of being optimized in various embodiments.

FIG. 2 depicts an example energy utilization system 120 that employs green energy solutions to supplement fuel-consuming electricity generation. As shown, a wind turbine 122 and solar panel 124 respectively convert natural forces (e.g., wind, solar) into electrical energy 126. Some or all of the electrical energy 126 can be employed in an electrolysis operation 128 where water is converted into separate hydrogen (H2) and oxygen (O2) gases that can be stored and utilized at a later time. It is contemplated that some electrolysis operations 128 vent the produced O2 and only store the produced H2.

While H2 can be transported, it is generally more efficient to generate, store and use the H2 on-site. The H2 is supplied to an electrical energy generator 130 alone, or in combination with another fuel 132, such as compressed natural gas (CNG), to be consumed in the creation of electricity 134 that is delivered to downstream consumers 108. The supplementation of fuel with H2 can provide reductions in environmental emissions, as well as other benefits.

Figure 3:
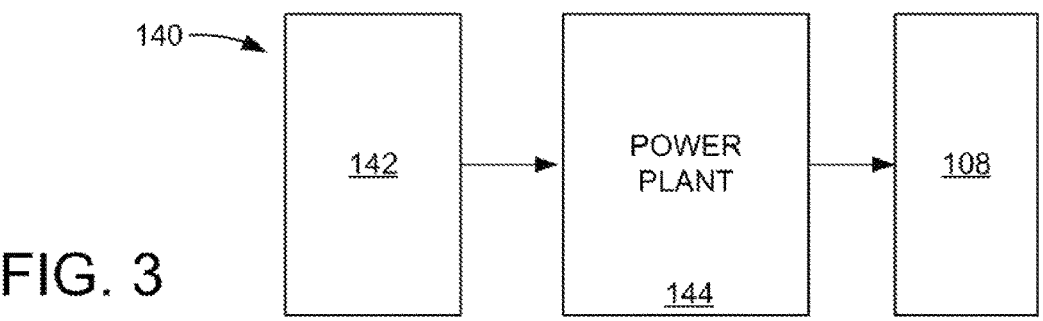
FIG. 3 represents a block representation of portions of an example electrical power generation system arranged in accordance with some embodiments.

FIG. 3 depicts a block representation of portions of an example energy utilization system 140 where one or more fuels 142 are supplied to a combustion mechanism 144, such as a power plant or vehicle, to be converted into electrical/mechanical energy that can be employed by downstream consumers 108. While the combustion mechanism 144 may produce electricity at any volume, pricing and availability models imposed by regulatory agencies create dynamic profitability structures for the translation of fuels 142 into electricity. Hence, the static capabilities of power plant combustion mechanisms 144 to produce electricity in certain volumes at unmitigated costs limits the profitability, even with the inclusion of fuels sourced from cheaper origins, such as hydroelectric, wind, and solar devices that have intermittent supply characteristics.

Figure 4:
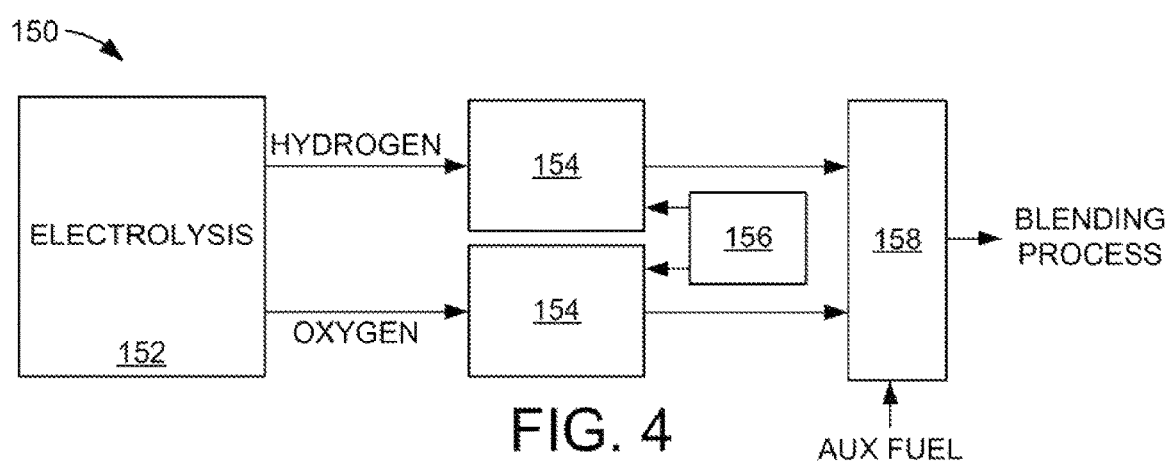
FIG. 4 conveys a block representation of an example power utilization system configured in accordance with assorted embodiments.

FIG. 4 depicts a block representation of an example energy utilization system 150 configured in accordance with various embodiments to provide optimized delivery of fuels and generation of electricity by a fuel combustion mechanism 144. Although not required or limiting, electrolysis 152 can be used to convert electrical power into separate hydrogen and oxygen gases that are safely transported close to the mechanism 144 where they are respectively stored in interconnected storage pods 154. A storage section 156 intelligently manages the volume and pressure of the respective gases to ensure the availability for the power plant 144.

It is contemplated that a gaseous fuel such as H2, CNG, O2, methane (CH4), etc. is delivered directly to the combustion mechanism 144, but some embodiments blend two or more gases to provide a fuel ratio selected by a blend module 158 that provides optimal electrical power generation, emissions, timing, and cost. As a result of the intelligent storage and blending of gases produced from natural forces, the combustion mechanism 144 can enjoy cost mitigation of other fuels, such as natural gas, along with the ability to employ dynamic electrical power generation timing and volume due to the selected fuel blend. In some embodiments, the storage section 156 selects where to deliver gases, such as to vehicles powered by hydrogen.

Figure 5:
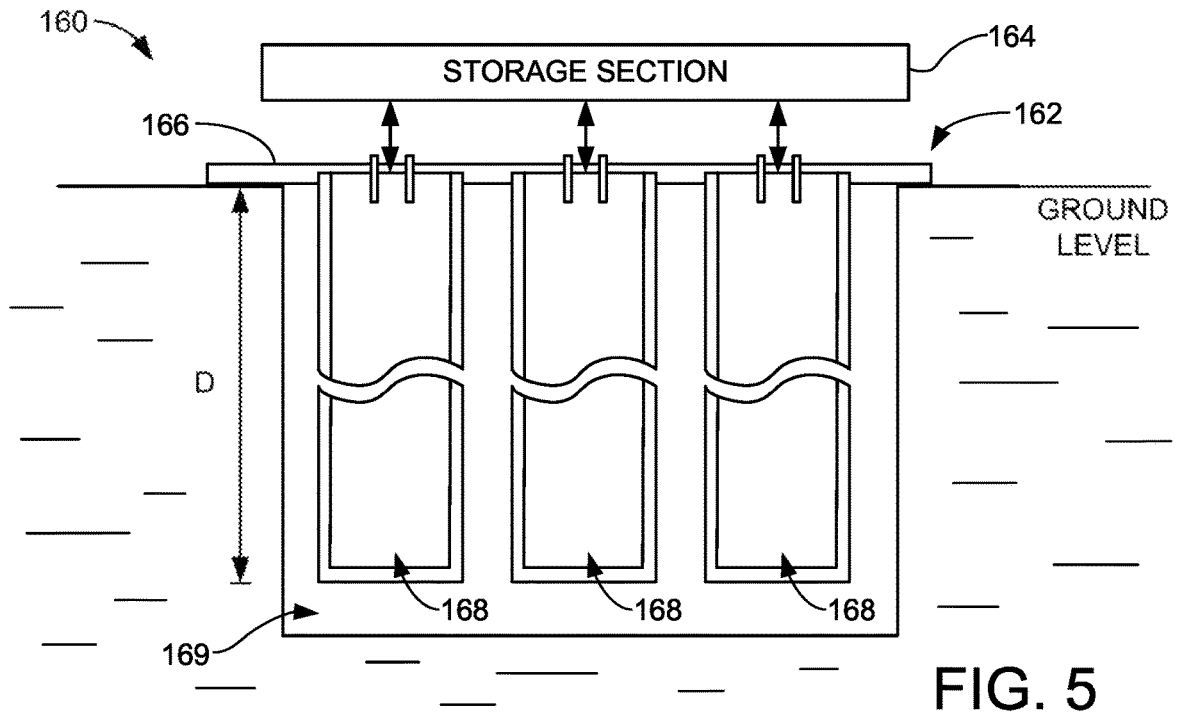
FIG. 5 depicts a line representation of portions of an example power utilization system employed in accordance with various embodiments.

FIG. 5 illustrates portions of an example energy utilization system 160 where a storage pod 162 is connected to a storage section 164 that employs at least a controller and storage circuit to generate a storage strategy that is executed to maintain the availability one or more gases for a downstream power plant. The storage pod 162 includes a support plate 166 from which extend a number of storage vessels (modules) 168 down into a bore (hole) 169.

As such, the storage pod 162 provides sub-surface storage of the gas or gasses stored by the modules 168, which extend a depth (D) underground from ground level. In some non-limiting embodiments, the bore 169 is a caisson-type well hole with a depth on the order of about 50 feet, and each of the modules have a length of on the order of about 42 feet. Other arrangements, sizes and numbers of modules per pod can be used as desired.

While above ground tanks or other vessels may be utilized, such above ground storage arrangements tend to take up large volumes of space, are subject to solar and ambient temperature effects, and can provide a number safety and security concerns. By contrast, sub-surface storage such as represented in FIG. 5 mitigates these and other effects. For example, the temperature and other environmental conditions within the bore 169 beginning even a few feet below ground level will remain relatively constant year-round, irrespective of the temperature and other environmental conditions above ground. Similarly, a fire or other combustion event will largely be contained within the wellbore, and so on.

While not required, in some cases the respective vessels 166 may be constructed with replaceable sleeves 168 that allow for the mitigation of material embrittlement while providing an increased degree of safety compared to vessels without interchangeable internal materials. Other arrangements provide individually replaceable storage modules 168, or the ability to replace an entire storage pod. The use of multiple adjacent pods 162 allows the storage section 164 to alter the storage conditions of the stored gas (e.g., composition, pressures, storage ratios, etc.), which provides the ability to dynamically adjust to power plant demand to increase electricity generation efficiency and performance while decreasing emissions.

Figure 6:
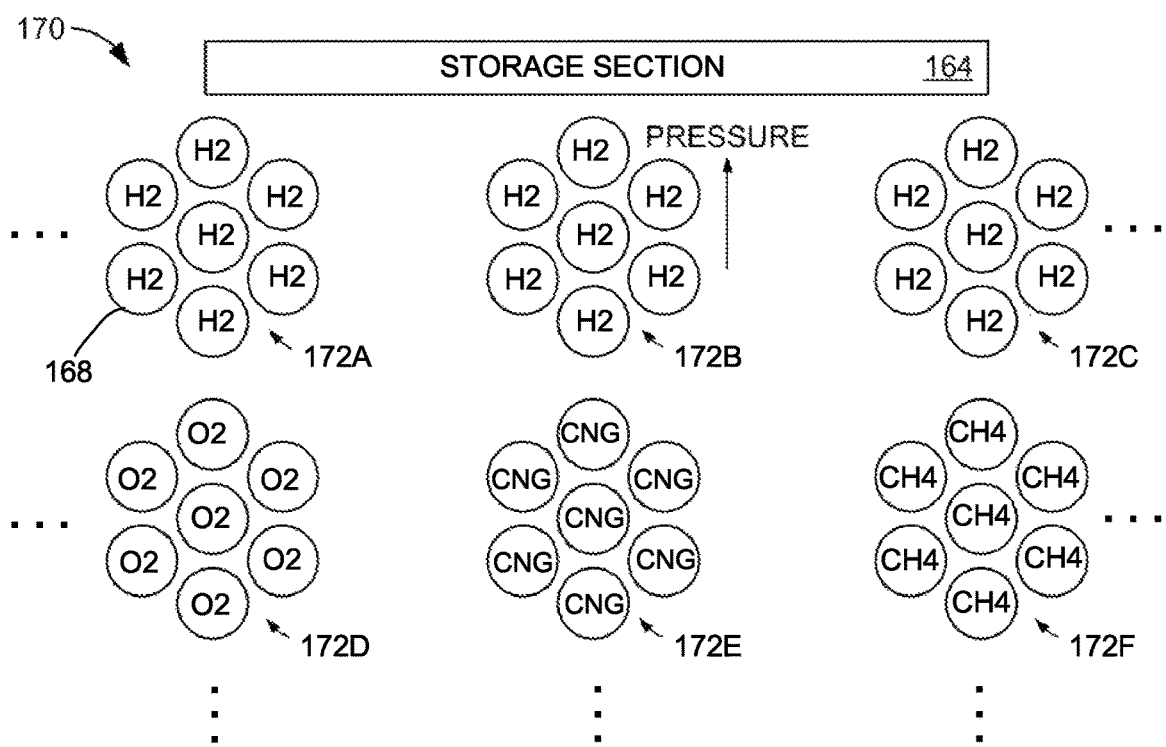
FIG. 6 conveys a line representation of portions of an example power utilization system operated in accordance with some embodiments.

FIG. 6 depicts an example pod farm 170 that can be used to provide modular sub-surface storage of one or more gases for use as a fuel. The pod farm 170 is made up of a number of adjacent storage pods such as 162 in FIG. 5. In the example of FIG. 6, a total of six (6) storage pods are shown at 172A through 172F, all of which operate under the direction of a storage section 164. Each storage pod 172A-172F includes seven (7) storage vessels (modules) 168 arranged in a generally hexagonal pattern, although other pod arrangements can be used.

Three of the pods 172A through 172C are shown to store hydrogen (H2); pod 172D stores oxygen (O2); pod 172E stores compressed natural gas (CNG); and pod 172F stores methane (CH4). It will be appreciated that, in practice, only one or two types of gases may be stored in a given pod farm, so FIG. 6 merely illustrates the various types of gases that may be used in different arrangements. Moreover, it will be recognized that CNG is largely made up of CH4, so these may be treated as nominally identical in some cases. Nonetheless, any number of other types of gases may be stored as well, at any respective storage ratios.

The storage section 164 can include the necessary hardware, circuitry, sensors, valves, etc. to control the operation of the pod farm 170 during the filling, storage and dispensing of the stored gases within the pod farm. In some cases, the storage section 164 may include a programmable processor, controller, or other logic to carry out the various control functions described herein. Over time, the storage section 164 may allocate new storage in different ratios, pressures, types of gas, etc., so that a given pod that stores a first type of gas may be transitioned to store a different, second type of gas. While each pod 172A-172F is shown to have storage modules 168 that store the same type of gas, this is not necessarily required. In other embodiments, some portion of the modules within a given pod can be used to store a first gas and other portion of the modules within that pod can store a second gas, and so on. However, based on the scale of the system, it may be advantageous to store a common gas type in each pod, and to fluidically interconnect the modules to provide a larger, common combined storage space for the stored gas.

Figure 7:
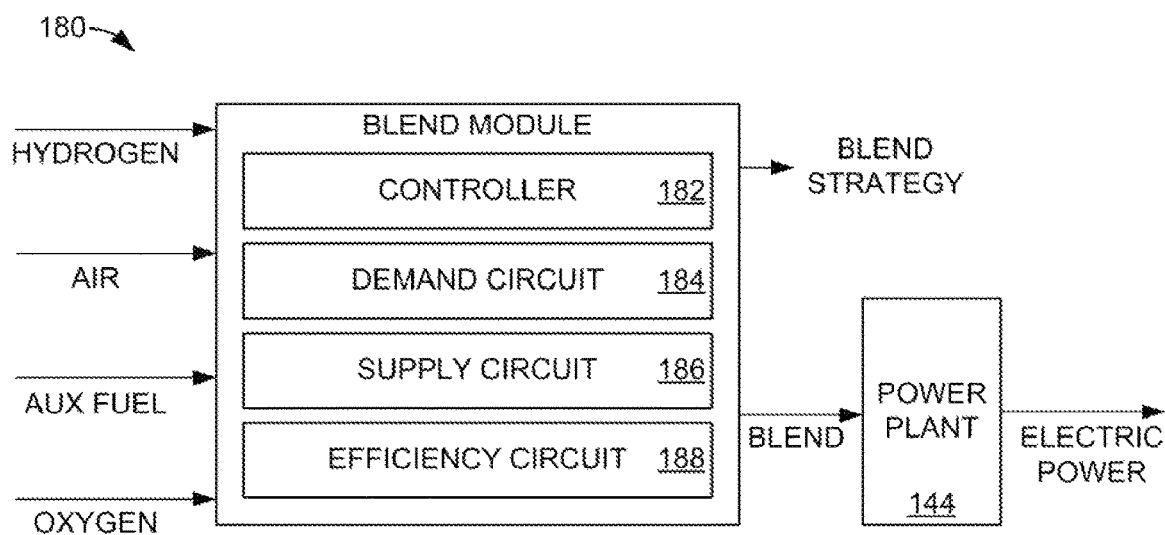
FIG. 7 shows a block representation of portions of an example power utilization system configured in accordance with assorted embodiments.

By intelligently altering the pressure and/or gas stored in a vessel, the storage section 164 can mitigate vessel embrittlement and adapt to changing electricity generation conditions, such as cost, demand, and timing. The addition of intelligent blending of gases can complement the intelligent storage of gases to optimize the operation of a power plant. FIG. 7 depicts a block representation of an example blend module 180 that can employ a controller 182 to generate and execute a blending strategy that provides a predetermined fuel ratio to one or more electrical energy generators.

The blend module 180 can have a demand circuit 184 that evaluates past, current, and predicted future demand for fuels to provide the blend strategy with prescribed volumes of fuels that can be consistently and reliably supplied. The demand circuit 184 allows the blend strategy to be practical and executable without undue delay from lack of fuel supply. Use of the demand circuit 184, in some embodiments, can manage fuel nominations, which can provide a physical hedge. The accurate understanding of dynamic demand, via the demand circuit 184, can allow the blend module 180 to selectively take fuel from a supply line and/or existing tank to meet demand with proper fuel volume, fuel pressure, and mitigated fuel costs, such as during peak demand conditions.

A supply circuit 186 can operate with the storage section of a system to determine the real-time and future fuel supply capabilities of a system, which corresponds with the ability of the blend module 180 to provide a fuel ratio prescribed by the blending strategy. The fuel ratio that provides optimized electrical generation efficiency and cost can be determined by an efficiency circuit 188 that evaluates environmental conditions as well as the operating performance of an electrical generator. The efficiency circuit 188 can set different fuel ratios correlating to any number of factors, such as cost of auxiliary fuel (natural gas), dynamic operating parameters of a generator, and humidity of ambient air, to provide fuel at minimal cost without jeopardizing electrical generation timing, emissions, speed, or efficiency.

With the blending strategy proactively setting different fuel ratios correlated to different detected, or predicted, electrical generation parameters, along with the consideration for fuel cost, emissions, electrical grid selection, and electricity pricing models, the blend module 180 can provide quick and dynamic adjustments to the storage and/or supply of fuels to maintain electrical power generation at the lowest cost and highest possible efficiency. The blend may also be optimized for other machines employing turbines, such as jet engines, to increase operational efficiency while decreasing fuel cost.

Alternatively, the blending strategy can be optimized for non-electrical power plant usage, such as in internal combustion engines, locomotives, or industrial equipment. In other words, the blend of fuels and air can be optimized by the blend module for combustion engines due to the relatively high octane rating of auxiliary fuels, such as natural gas, and the ability to mitigate unburned hydrocarbons by blending pure hydrogen. It is noted that hydrogen burns relatively quickly for a large concentration range, such as 5-75%, which results in a faster, more complete, and more efficient burn for combustion engines of all displacements. As an another non-limiting example, the blend could be optimized for large vessels, such as trains or ships, by utilizing more pure oxygen that causes internal combustion engines (ICE), such as but not limited to diesel engines, to operate more efficiently and with reduced emissions.

Figure 8:
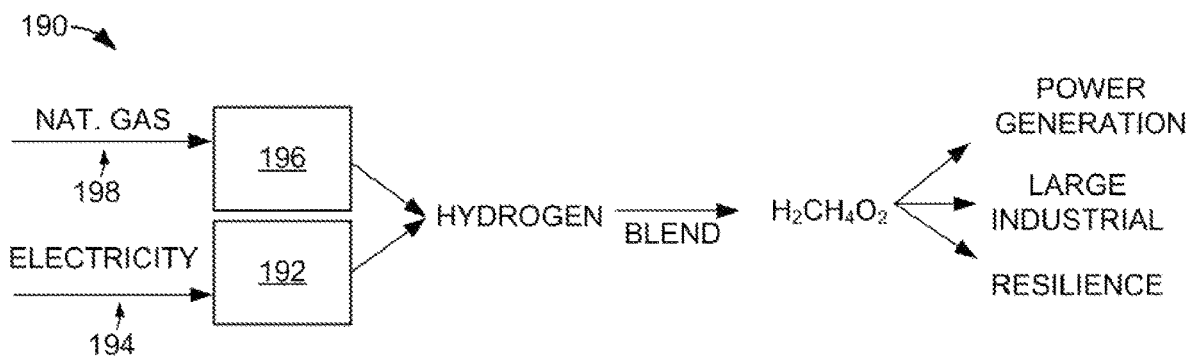
FIG. 8 depicts a block representation of a blending procedure that can be carried out by an energy utilization system in some embodiments.

FIG. 8 depicts a block representation of an example blending procedure 190 that can be carried out by the blend module 180 in accordance with some embodiments. Through the transformation of water into hydrogen via electrolysis 192 from electricity from natural forces 194, such as wind, water, geothermal, or solar energy, or via steam methane reforming 196 from one or more natural gas sources 198, the blend strategy is conducted to create a predetermined mixture of different gases, which can be defined as a molar gas fraction.

The predetermined blend of gases can be selected with respect to the operational parameters of a power generator, such as a blend that decreases maintenance demand or operational stress on generator components, or selected with respect to the cost per unit of electricity generated. While not limiting, the intelligent modification of the mixture of gases in accordance with a predetermined blending strategy allows for optimal cost, operational efficiency, or speed for various purposes, such as power generation, industrial combustion, residential heating, and vehicle operation.

Figure 9:
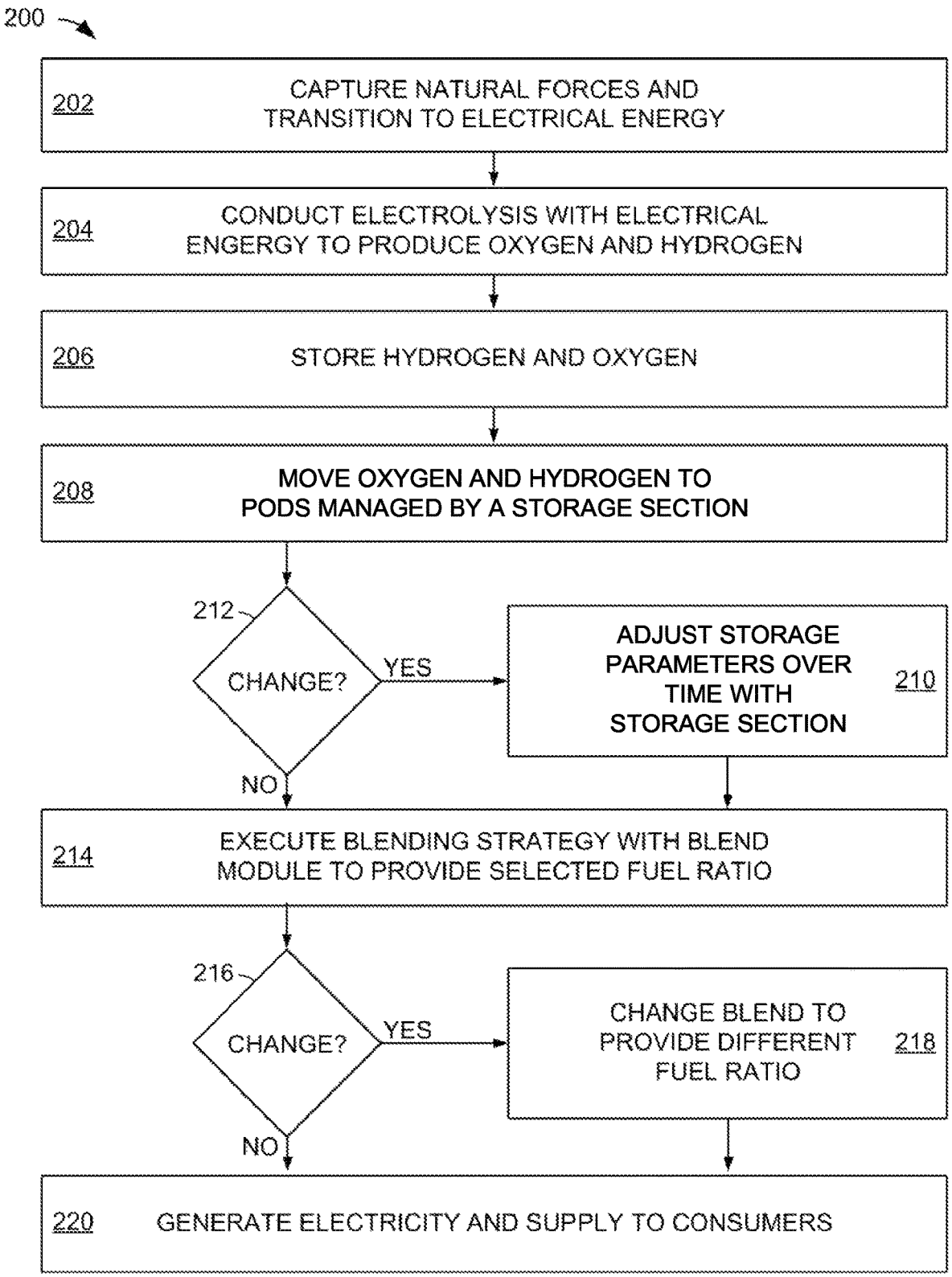
FIG. 9 shows an example power utilization routine that may be employed by the various embodiments disclosed herein.

FIG. 9 is a flowchart of an example energy utilization routine 200 that can employ assorted embodiments of FIGS. 1-8. Natural forces are captured in step 202 and transitioned into electrical energy that is immediately utilized in one or more electrolysis operations in step 204 to create hydrogen gas and oxygen gas that are each captured and stored in step 206. It is noted that additional fuels, such as propane, butane, methane, and hexane, can be concurrently stored in storage vessels of one or more storage pods.

Via one or more transportation means, step 208 moves the stored gases each to vessels of a storage pod connected to a storage section. The storage section dynamically adjusts the gas storage parameters, such as storage pressure and/or storage ratio of stored gas volumes, over time in step 210 in response to decision 212 determining a change in supply, cost, and/or demand is imminent or predicted. At the conclusion of step 210, or in the event decision 212 does not prompt a change in storage parameters, step 214 executes a blending strategy to provide a fuel ratio from the storage pod to a power plant to allow for the generation of electrical energy. Decision 216 evaluates if changes to electricity demand and/or pricing has changed. If so, step 218 changes to a different fuel ratio of the blending strategy.

It is also contemplated that step 218 can alter the fuel ratio in response to other detected or predicted conditions, such as supply of fuel, cost of fuel, or operating parameters of power plant generators. With the optimal fuel ratio, step 220 can proceed to generate electricity that is supplied to consumers via a power grid. Accordingly, the blend module can provide a dynamic fuel ratio that adapts to changing supply, demand, and use conditions to ensure maximum fuel delivery performance at the best possible cost. Through the assorted embodiments of a fuel storage and blending system, multiple fuels can be safely and efficiently stored at pressures that allow for intelligent fuel blends to be consistently delivered with at least threshold pressure for a predetermined amount of time, such as one minute, one hour, or multiple hours.

Figure 10:
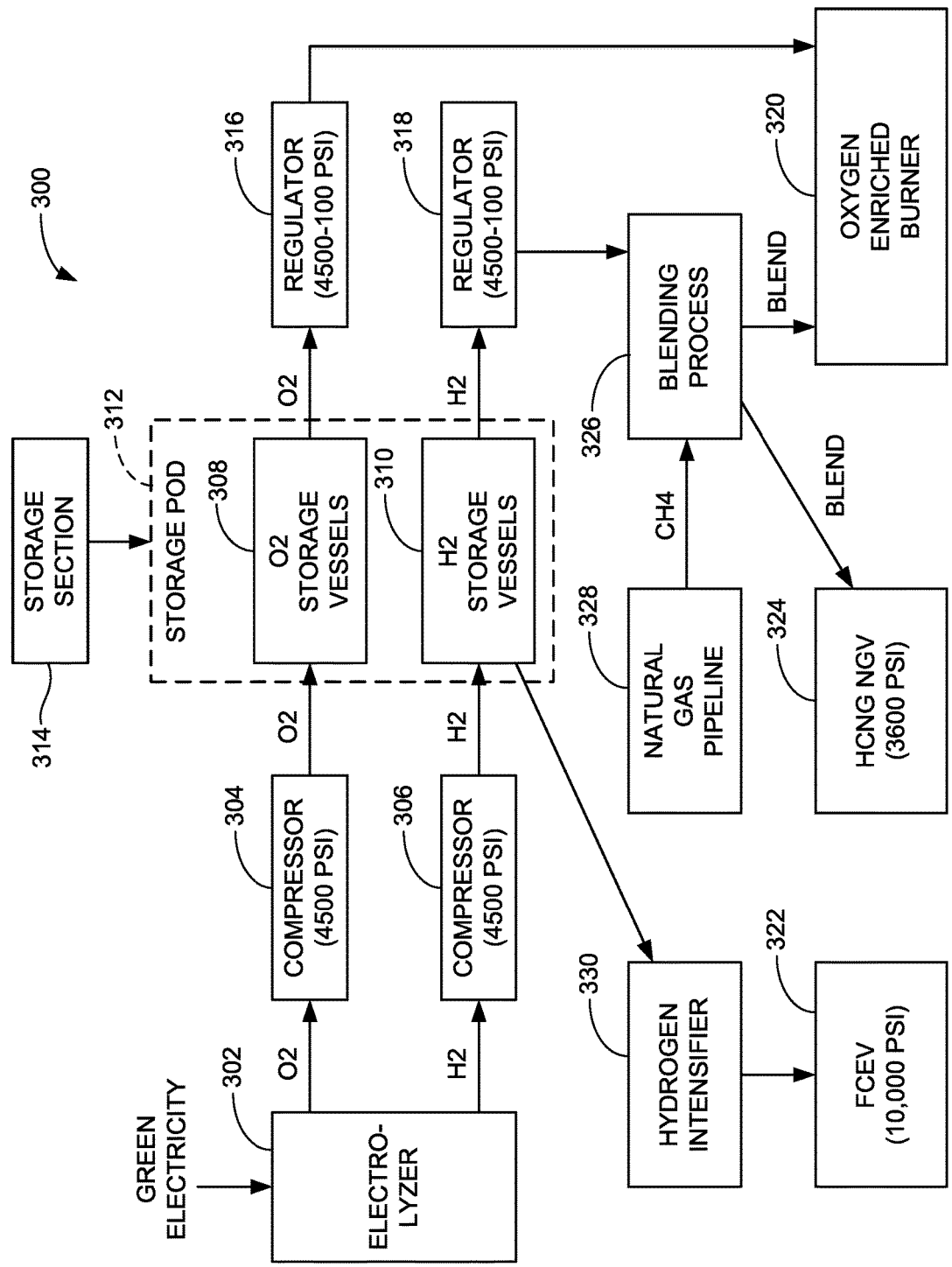
FIG. 10 provides another example power utilization system constructed and operated in accordance with further embodiments.

FIG. 10 provides another example power utilization system 300 constructed and operated in accordance with further embodiments. Various alternatives can be utilized. An electrolyzer 302 operates from a green electricity input to split water into respective oxygen (O2) and hydrogen (H2) streams. The streams are respectively compressed using compressors 304, 306 for storage in respective storage vessels 308, 310 of one or more storage pods 312 under the control of a storage section 314. The fuels are shown to be stored at a storage pressure of 4500 pounds per square inch (PSI), and regulators 316, 318 are used as desired to reduce the storage pressure to a lower delivery pressure such as 100 PSI. Other respective pressures can be used as required.

The system 300 can be configured to supply gases to various receiving mechanisms, such as an oxygen enriched burner 320, a pure hydrogen fuel cell electric vehicle (FCEV) 322 and/or a natural gas powered vehicle 324, such as a hydrogen compressed natural gas (HCNG) compatible vehicle. The burner 320 is fueled using a stream of regulated O2 as well as a blend of regulated H2 and natural gas (CH4) supplied by a blending process 326 and a natural gas pipeline (conduit) 328. The FCEV 322 is fueled using high pressure compressed hydrogen (such as at a pressure of 10,000 PSI) established by a hydrogen intensifier 330. The HCNG NGV is fueled using a blend of H2 and CH4 from the blending process 326 at another suitable fueling pressure such as 3600 PSI. It will be appreciated that the dispensed fuels to the respective vehicles 322, 324 may be supplied to a suitable storage tank of the associated vehicle.

Figure 11:
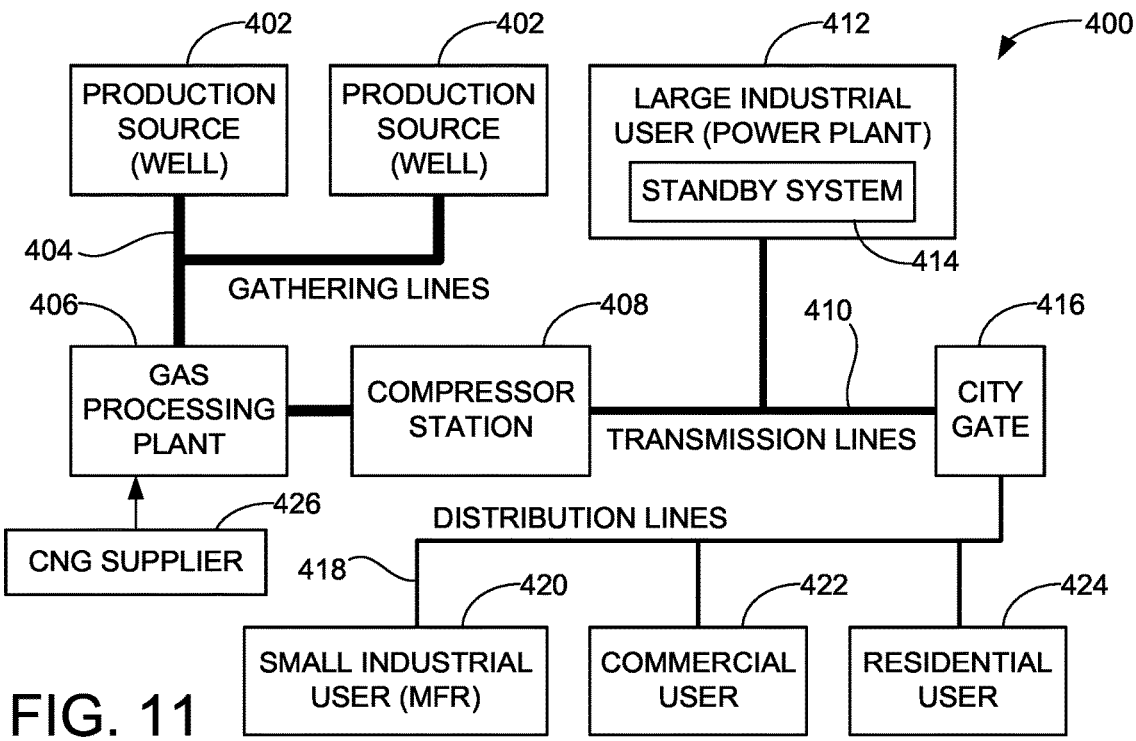
FIG. 11 is a schematic representation of a natural gas pipeline transportation system constructed and operated in accordance with further embodiments.

Further embodiments of the present disclosure are generally directed to addressing issues relating to insufficient capabilities of an existing fuel supply infrastructure to meet ongoing demand. To this end, FIG. 11 provides a schematic representation of a natural gas pipeline transportation system 400 constructed and operated in accordance with further embodiments of the present disclosure.

It will be recognized that the system 400 is simplified in nature, and various alternatives and additional elements can be incorporated in the system as required. For example, it is common to utilize various elements including but not limited to compressors, dryers, filters, valves, traps, sensors, etc. throughout a system such as 400, but such have been omitted for purposes of clarity.

The system 400 generally operates to generate, process and supply fuel, in this case natural gas, to a number of customers. The natural gas is initially provided from a number of production sources 402, such as oil and gas wells, and is transported via gas pipelines 404 to a gas processing plant 406. The gas pipelines 404 are sometimes referred to as gathering lines and may extend many miles to reach the plant 406. Other transportation mechanisms, such as truck or rail, can be used to provide the native natural gas to the plant.

Native natural gas usually includes multiple hydrocarbons as well as other liquids, condensates and contaminants. The most prevalent hydrocarbon is typically methane (CH4), but other components can include ethane (C2H6), butane (C4H10), pentane (C5H12), etc. Water vapor can be present, as can other contaminants such as hydrogen sulfide (H2S). As a result, the gas processing plant 406 conditions the natural gas into a suitable form for transport and use.

A compressor station 408 conditions the natural gas for transmission along a set of transmission pipelines 410 by imparting to the gas a suitable transportation pressure and flow rate. While not limiting, transmission pipelines 410 transfer the natural gas over relatively long distances, and as such, tend to have relatively large internal diameters (e.g., 48 inches, etc.) and accommodate relatively high gas pressures (e.g., 1500 psi, etc.). Supplemental compressor stations and other equipment may be provided along the pipeline to maintain the desired flow. The transmission pipelines 410 may extend for tens, hundreds or even thousands of miles, may be interstate or intrastate, may be looped, multi-channel, bi-directional, etc. depending on the requirements of a given system.

Some large industrial users of the system may utilize gas as supplied directly from the transmission pipelines 410, such as an exemplary power plant 412. It is contemplated that the power plant 412 uses the gas as a primary fuel for a power generation mechanism, such as a gas turbine, a fuel cell, etc. to generate electricity. The plant 412 includes a standby system 414 which utilizes various embodiments of the present disclosure to ensure continuous operation of the plant even during a curtailment event involving the gas being supplied along the transmission pipeline network.

The standby system 414 may be a separate power generation mechanism (e.g., a standby generator, etc.), or may be the primary power generation mechanism reconfigured to operate on a different fuel. For example, some gas turbines are arranged to operate either on gaseous fuel (e.g., CNG) or on liquid fuel (e.g., diesel fuel, etc.) through the switching in of different inlets, piping, injectors, etc.

A city gate is depicted at 416. This may correspond to a local municipality or other local distribution network where the transmission lines 410 feed into a lower pressure distribution system that brings the natural gas directly to various homes and businesses via distribution lines 418. The pressure of the gas is significantly reduced for such residential and small business customers, and may be as little as on the order of from about 40 psi to about 200 psi, although other ranges can be used. An odorant (such as mercaptan) may be added to the gas at this time, and the utility provider monitors and maintains the distribution system as the gas is provided to various local customers including small industrial users (such as manufacturers) 420, commercial businesses 422 and residential users 424. The overall network may be owned and operated by a CNG supplier 426.

The system 400 represents a localized or regional gas distribution system, which forms a portion of a larger energy infrastructure network. As will be recognized, in recent years there has been continued interest in expanding such infrastructure networks in the United States and abroad with renewable energy sources, such as in the form of wind farms, solar farms, and other green energy sources, and reducing or eliminating other, more traditional energy sources such as coal. While providing many benefits, it is becoming increasingly apparent that severe storm events and other environmental situations can arise where there is insufficient capability within the infrastructure to meet the ongoing demand.

For example, a severe ice storm may ice over the blades of a wind farm; excessive snow and cloud cover can reduce effectiveness of solar power arrays; freezing temperatures can adversely impact the operation of natural gas pipeline equipment, and so on. Other exception events can be periods of exceptionally high demand due to excessive temperatures during summer months. These and other types of exception events can place severe restraints upon natural gas pipelines, to the extent that there is insufficient gas to meet the current demand. The available gas is prioritized so that the gas continues to be supplied to those parties with the highest priority, and other parties with lower priority may be required to reduce or interrupt further usage.

As a result, a natural gas fueled power plant, such as the plant 412 in FIG. 11, may be notified by the natural gas supplier that they have a short amount of time to disconnect from the pipeline and initiate backup power arrangements. This notification is sometimes referred to as a curtailment notice, and the time allotted for the power plant to cease further use of the natural gas from the transmission pipeline 410 may be relatively short, such as on the order of an hour. Curtailment notifications and priorities are a complicated system governed by the appropriate federal or state agencies, but oftentimes there is an established priority based on need so that higher priority customers are serviced while lower priority customers may experience an interruption of service.

It is common for power plants to plan on such contingencies by providing a backup system, such as through the use of a dual fuel gas turbine, to supply backup power. For example, in some cases a curtailment notification will be received instructing the plant to curtail further use of the primary fuel (e.g., CNG) within an hour or other short curtailment notice period. During this period, the power plant personnel will make the necessary system adjustments to bring standby diesel fuel online and disconnect/turn off the gas lines and other equipment that was previously used to supply the primary CNG fuel. While the technology exists to allow dual fuel switchovers at full load conditions (e.g., from CNG to diesel) without interruption, such equipment is expensive and is not in widespread use. Hence, it is more common to undergo a short interruption in power generation to the consumers as the equipment is switched from the primary fuel to the secondary fuel. This switchover operation is more extensive for those other cases where a completely separate standby system, such as a standby diesel generator, etc., is employed.

Once switched over, the backup power generation can only operate so long as sufficient fuel (e.g., diesel) is available. Once natural gas service is restored, the foregoing process must be repeated to effect a switchover back to the primary generation equipment configuration (which may involve another interruption in service).

While such systems have been found operable, there are a number of issues including cost, maintaining the diesel fuel in usable condition, testing the system to ensure it is in proper condition to be brought on line, ensuring adequate fuel stores are available and maintained, etc. Moreover, it is generally known that gas turbines and other forms of motive power generation can be difficult to bring online, as these types of systems are more efficient if continued operational states can be established and maintained.

Various embodiments of the present disclosure accordingly provide a method and an apparatus for providing a standby, backup power system configuration for use in response to curtailment and other exception conditions where primary fuel is not available at the normal pressures and flow rates from the normally used source. As explained below, some embodiments throttle the primary fuel and introduce a supplemental, secondary fuel to maintain continuous operation of the power plant or other industrial load.

Instead of reconfiguring the primary power generator system (such as by changing the fuel lines of a gas turbine to accept diesel or other liquid fuel, or by powering up a separate, backup system, etc.), the primary gas turbine or other component of the power plant is maintained in a continuous state of operation, operating on what amount of primary fuel is available, supplemented by a continued flow of the secondary fuel. It will be noted that the secondary fuel may be the same type of fuel, or a different type of fuel, as compared to the primary fuel.

An upstream throttle mechanism is activated in response to a curtailment notice or other exception event to maintain the meter side pressure of the primary fuel line to at or above a minimum required pressure or flow rate. This reduces, but does not shut off, the flow of primary fuel (e.g., CNG) into the plant. It is contemplated that there will be insufficient natural gas flow rate to maintain the power plant at the existing load, but some is better than none.

Augmented to this reduced flow is the secondary fuel that is blended into this flow to supply the required amount of fuel to the turbines at the required flow rates and pressures needed to operate the turbines.

In some embodiments, this secondary fuel may be CNG, H2, propane, CH4, some other previously stored fuel, or a blend of two or more of the stored fuels. The backup fuel will be stored in sub-surface storage pods such as described previously. In some cases, cryogenic techniques may be applied so that the secondary fuels are stored in liquid form (e.g., liquid natural gas, liquid hydrogen, etc.).

This novel solution provides a number of potential benefits. One advantage of this is that the storage pods can accumulate CNG during normal periods of operation such as at night or at other non-peak demand periods, times when prices are lower, etc. A secondary H2 generation system can also be provided that can use solar, wind or even energy produced by the gas turbines to generate and store H2 in the storage pods.

Another advantage is that hydrogen can continue to be generated and replenished during the exception event, provided that there is sufficient energy available to continue to run the electrolyzers or other equipment. For example, during a particularly bitter cold snap, the outside temperatures may continue to be excessively cold, but the previous cloud cover may have passed and the sun is now available for use with the solar panels to generate electricity (or the solar panels have now been cleared of ice and snow, etc.). Similarly, a period of calm winds has taken the wind turbines offline, but now there is sufficient wind energy to use the wind turbines to generate electricity, etc. There are other features and synergistic benefits to the system as well.

Figure 12:
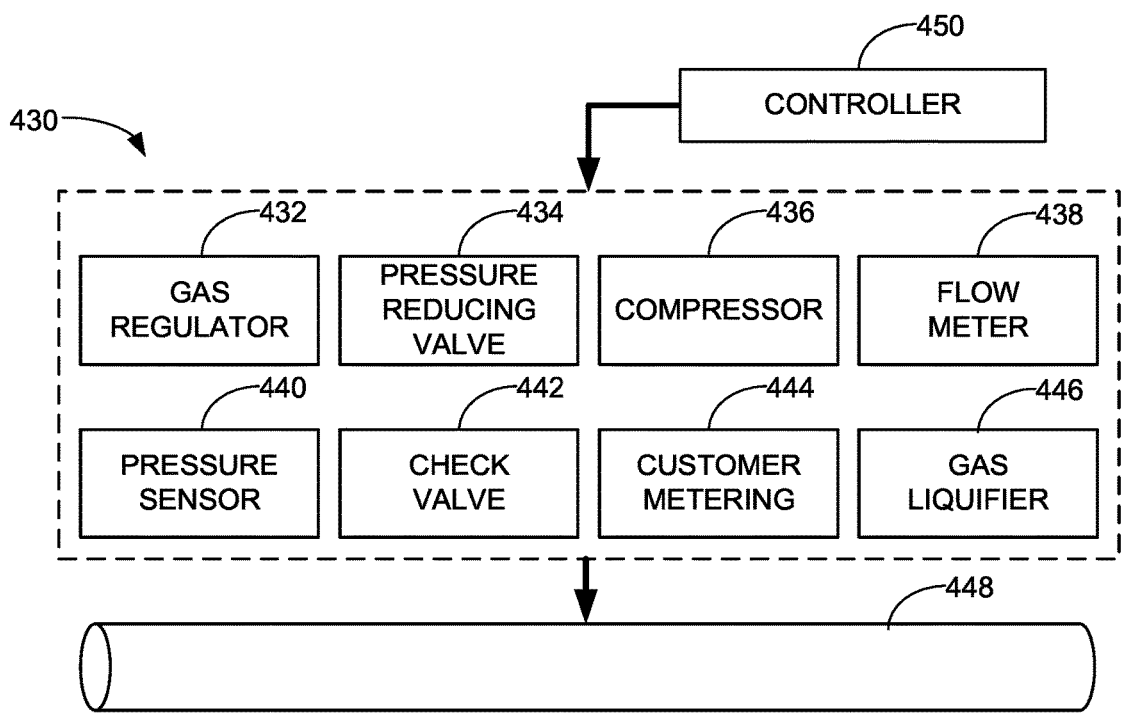
FIG. 12 shows aspects of a continuous fuel delivery system of FIG. 11 in some embodiments.

FIG. 12 is a functional block representation of aspects of a continuous fuel delivery system 430 of FIG. 11 in accordance with some embodiments. The system includes a number of operational modules that regulate the flow of both the primary fuel (e.g., natural gas from transmission lines 410) and the secondary fuel (e.g., natural gas, hydrogen, etc. from the storage pods). These modules include one or more gas regulators 432, pressure reducing valves (chokes) 434, compressors 436, flow meters 438, pressure sensors 440, one-way check valves 442, customer metering 444, optional gas liquification systems 446, and conduit (pipelines) 448. Each of these may operate under the direction of a top level controller 450. The controller 450 is sometimes referred to as a continuous operation controller.

Figure 13:
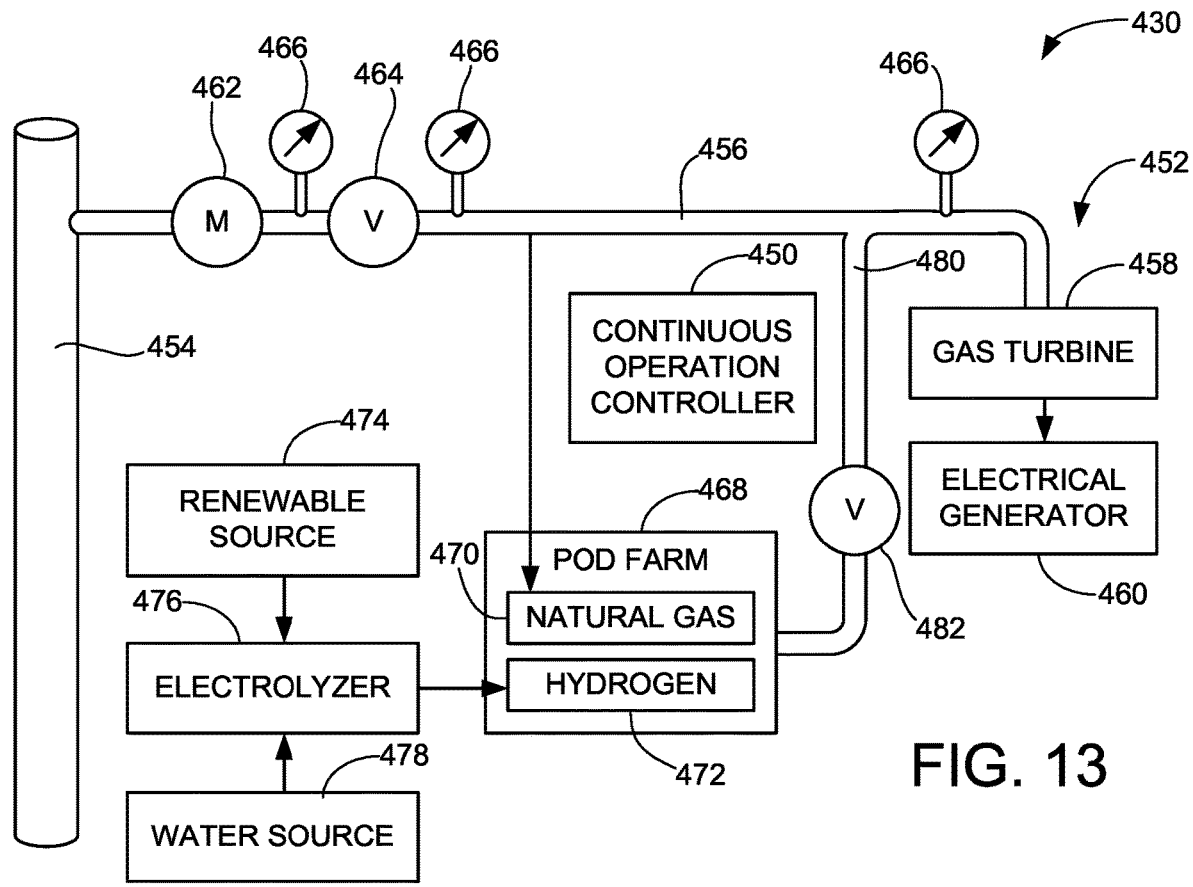
FIG. 13 is a schematic representation of a standby fuel storage system constructed and operated in accordance with further embodiments.

FIG. 13 is a schematic representation of the continuous fuel delivery system 430 of FIG. 12 in conjunction with aspects of a power plant 452 (corresponding to the power plant 412 in FIG. 11) and a high pressure transmission pipeline 454 (corresponding to the line 410 in FIG. 11). It will be appreciated that the continuous fuel delivery system 430 in FIG. 13 generally corresponds to the standby system 414 in FIG. 11 in accordance with some embodiments. Other configurations can be used.

A local distribution pipeline 456 extends from the main infrastructure pipeline 454 to supply natural gas as a primary fuel to a power generation mechanism in the form of a gas turbine 458. The turbine combusts the natural gas to generate motive power that turns an electrical generator stage 460. Other power generation mechanism configurations can be used.

During normal operational conditions, the natural gas is supplied to the turbine 458 at a selected pressure and a selected flow rate to meet the electrical demand from the generator 460. To this end, various control components are coupled to the distribution pipeline 456, including a customer meter (M) 462, a valving arrangement (V) 464, and various sensors/instrumentation 466 (flow meters, pressure sensors, etc.). Other elements may be used as required, so FIG. 13 is merely illustrative and not limiting.

The turbine 458 will have a specific fuel consumption rate in terms of the amount of fuel consumed by the turbine to generate each unit of power over a given period of time. The specific fuel consumption can be expressed in a variety of ways, such as mcf/hr (million cubic feet per hour) or kg/hr (kilograms per hour). Because the primary and secondary fuels are in the form of a gas, the fuel consumption rate is described herein in terms of flow rate and pressure. Other equivalent expressions for the fuel consumption rate can be used.

Ultimately, during a normal mode of operation the turbine 458 will consume the natural gas supplied by the local distribution line 454 at a normal fuel consumption rate, which will correspond to a selected pressure and a selected flow rate of the injected gas. The secondary fuel is switched in during a secondary or standby mode of operation of the turbine 458. The secondary mode can be implemented under various conditions, such as when the local distribution line 454 is unable to supply a sufficient amount of natural gas to meet this normal fuel consumption rate. Other circumstances can include periods of excessive cost or peak demand cost, where it is less expensive or otherwise advantageous to use the previously stored fuel rather than the primary fuel at the normal rate.

The secondary fuel is stored in a pod farm shown at 468. The pod farm 468 is located relatively near the power plant 452 and stores at least one secondary fuel. In this example, some amount of the overall capacity of the farm is used to store natural gas 470, and the remaining capacity of the farm is used to store hydrogen (H2). In alternative configurations, the pod farm 468 can store 100% of a single secondary fuel (natural gas, hydrogen, etc.). Substantially any other type of fuel can be stored in lieu of or in addition to natural gas and/or hydrogen. As a general rule, natural gas tends to have a higher energy density as compared to the energy density of hydrogen. Nonetheless, it can be advantageous to store both gases, or even solely hydrogen, depending on the operational requirements at a given time (which can vary).

The natural gas 470 can be accumulated during relatively low demand periods from the distribution pipeline 456. While not shown, such operations may include directing a flow of the gas through various elements such as described above in FIG. 10 to store the natural gas at a desired storage pressure (e.g., 4600 psi, etc.).

The hydrogen gas 472 can be delivered to the storage farm, or can be generated on-site. If generated on-site, one or more renewable sources of energy 474, such as solar panel arrays, windmill arrays, etc. can be used to intermittently generate electricity responsive to favorable weather conditions. The electricity is supplied to an electrolyzer (hydrolyzer) 476, which operates to split water (H2O) from a local water source 478 into H2 and O2 streams. As before the O2 can be captured and stored as well, but only the H2 component is shown in FIG. 13. In further embodiments, the electricity from the renewable source(s) 474 can also operate the water source (e.g., reverse osmosis, filtering, pumping etc.). In an alternative embodiment, some of the electrical power generated by the electrical generator 460 is used to operate the electrolyzer 476 and water source 478.

It is contemplated albeit not necessarily required that the times during which the secondary fuel stored in the pod farm 468 is actually utilized may be infrequent and relatively short lived. Thus, there will usually be sufficient time to accumulate the secondary fuel 470, 472 at a reasonable rate and cost. Because the secondary fuels are being used in lieu of a separate backup system (note the absence of a diesel generator in FIG. 13), a minimum specified amount of secondary fuel may be maintained at all times to meet the anticipated needs of the system.

To switch in the augmented secondary fuel, a secondary distribution pipeline 480 is coupled to the main distribution pipeline 456 via suitable valving arrangements such as represented at 482. When opened, the secondary fuel can flow to the gas turbine 458 for combustion thereby.

The system 430 operates as follows. During normal operation, the system monitors the use of the primary fuel from the main infrastructure pipeline and performs various background operations as needed, such as generating and storing the secondary fuel. This continues until the occurrence of a curtailment event, which indicates that there is, or will be in the near future, insufficient primary fuel (natural gas in this case) from the infrastructure pipeline 454 to meet the specific fuel consumption needs of the turbine. This may take the form of a specific curtailment notice from the utility supplier associated with the infrastructure pipeline or some other associated authority.

In response to the curtailment event, the continuous operation controller 450 operates to activate the valving arrangement 464 to significantly reduce the flow rate of natural gas admitted from the pipeline 454. While a variety of valve arrangements can be used, including pressure regulating valves, the valving is adjusted so that sufficient natural gas continues to flow into the system while at or above mandated or specified levels. These levels may be determined by the supplier (426, FIG. 11) but may include meter-side pressure, customer side pressure, flow rates (including MCFM, etc.), or other flow parameters. The valve 464 is not closed completely (unless required), but in at least some cases will still enable some amount of natural gas to continue to flow into the system.

At the same time, the controller 450 activates the valving arrangement 482 to introduce sufficient secondary fuel for blending with the available primary fuel to continue operation of the gas turbine. If only natural gas is released as a secondary fuel, then all that is essentially required is that the gas turbine continue to receive the gas at the normal fuel consumption rate (e.g., selected pressure and flow rate, etc.). If H2 is supplied, some adjustments may be required to switch over to a blend of natural gas and H2 to provide the equivalent fuel consumption rate to generate the desired work output. It will be noted that many current generation gas turbines such as 458 have the capability to adaptively adjust to different detected blends in the inlet gas fuel.

In the current example, it is contemplated that the turbine 458 is capable of combusting from 0% to 100% natural gas and 0% to 100% H2 on-the-fly. Other configurations can readily be used with the current system. For example, if the gas turbine can only accommodate up to some maximum amount of H2 such as 20%, then the respective amounts of natural gas from both the primary distribution line 456 and the secondary distribution line in comparison to the amount of H2 will be controlled to ensure that no more than 20% H2 will appear in the injected blended fuel.

It will be noted that the pod farm 468 will store sufficient secondary fuel to enable continued operation for the power plant. The ability to have at least a portion of the normally available natural gas (even 10% of normal) will significantly extend the time during which the plant 452 can operate in secondary fuel mode.

The overall capacity of the pod farm will thus depend on how long the plant is specified to be able to operate prior to resumption of full service from the transmission pipeline 454. This could be measured in hours, days, weeks, etc., the same as for a secondary power system that utilizes diesel fuel (or some other fuel) and a diesel engine to generate the electrical power.

However, since the gas turbine 458 is still connected and has not interrupted operation, the plant 452 can take advantage of partial increases in the available natural gas. Stated another way, as the emergency condition is slowly cleared and more natural gas is available via the line 454, the plant 452 can operate at successive levels (such as) 10% of the normal amount, then 25%, 50%, 80% and then finally, 100% of the normal input level. This ability to adaptively adjust to the amount of primary fuel necessarily extends the operational supply of the secondary fuel. This type of operation is not generally possible using a dual fuel turbine or other generator that requires a switchover operation to switch back from diesel to natural gas.

This reveals a related benefit of the system of FIG. 13; during a particularly severe shortage of natural gas in the network, the power plant 458 can continue to operate for an extended period of time using only a percentage (e.g., 20% to 80%, etc.) of the normally used primary fuel, allowing the balance of this natural gas that would otherwise been needed by the plant to be allocated to a higher priority source that affects health and human safety (e.g., a hospital, etc.).

The system 430 is advantageous even if the initial amount of primary fuel from the main pipeline 454 is 0% of the normal amount. In this case, the system will initially operate to supply 100% of the needed fuel to the gas turbine 458 during the continuous operation thereof. However, as service is slowly restored the system can adaptively receive and increase the amount of available primary fuel up to some positive percentage (e.g., 10%, etc.) and continue operation as described above.

The system 430 in FIG. 13 not only can be used in backup supply modes during an exception event, but can also be used at substantially any time including normal modes of operation when the primary fuel is fully available. It is well established that introducing a small amount of hydrogen into an existing hydrocarbon (e.g., natural gas) stream can provide significant environmental improvements in the emissions from the process. Adding other gases such as oxygen (O2) can have similar beneficial effects. The controller 450 can thus be further configured to continuously blend the secondary fuel (pipeline 480) with the primary fuel (pipeline 456) to provide adaptively adjusted blended fuels for the gas turbine 458 as described above.

Figure 14:
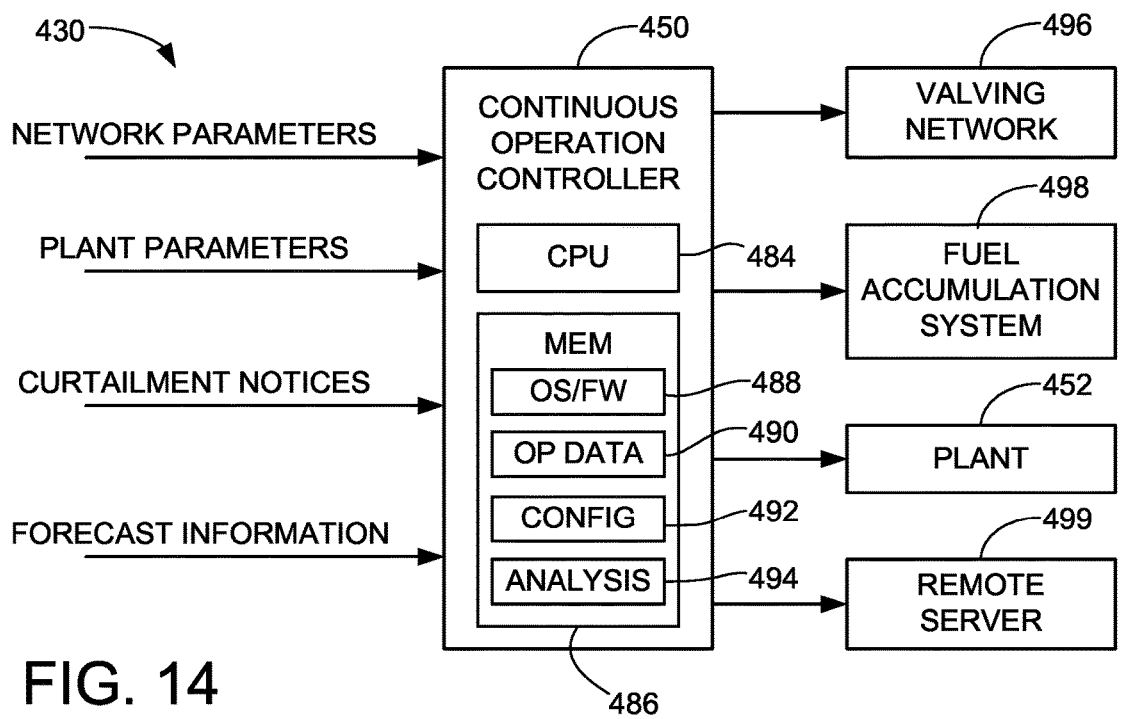
FIG. 14 shows a continuous operation controller configuration of FIG. 13 in some embodiments.

FIG. 14 shows a functional block representation of the system 430 from FIGS. 12-13 in accordance with further embodiments. It is contemplated albeit not necessarily required that the controller 450 may be a hardware based or programmable based processor with associated programming to carry out the various functions described herein. In FIG. 14, the controller 450 includes at least one programmable processor (CPU) 484 and local memory 486. The memory 486 includes operating system (OS) and/or firmware (FW) program instructions to enable operation of the controller. Operation (OP) data may be accumulated and stored as shown at 490, including history data and logs of events, system readings, etc. during operation.

A configuration (CONFIG) data set 492 provides preselected and/or updated configuration information for operation of the system under various conditions, including switching over and between the respective primary and secondary fuel modes discussed above. An analysis engine 494 can provide real time analysis and adjustments to the system to obtain optimum performance, extend life, switch between generation of H2 to accumulation of natural gas, and so on.

The controller 450 receives a number of inputs including but not limited to network parameters relating to the status of the piping network; plant parameters relating to ongoing and anticipated demand levels for the gas turbine and other elements; curtailment notices and other indications such as from the natural gas supplier (426, FIG. 11) of a pending reduction in availability of natural gas; and forecast information such as weather reports and predictions to further enable the system to prepare for an upcoming switchover event.

In turn, the controller 450 provides inputs to the entire system to carry out the aforedescribed operations. This can include electronic commands to various valving network elements 496 to open, close, throttle, adjust pressure settings, etc. The controller 450 can further provide control signals to a fuel accumulation system 498 to adjust the types, rates, amounts, pressures, etc. of the stored secondary fuel (e.g., natural gas 470, H2 472, etc.).

The controller can further communicate with the plant 452 to receive and direct messages and data based on existing and upcoming anticipated needs. Finally, while the controller 450 can operate as a standalone unit (including a wiregap system to prevent malicious attacks by unauthorized parties), the controller 450 can communicate with one or more remote servers 499 or other elements via a computer network (including the Internet).

Further details regarding the storage of the secondary fuel in sub-surface modules/pods/farms will now be discussed. While not necessarily required, the use of these types of sub-surface storage structures are particularly suitable for various embodiments. The pods are inexpensive, reliable, easily serviced, and expandable. Storage can be distributed and placed on-site near where the fuel will be needed. The system is space efficient and easily expanded to accommodate greater volumes of storage through the installation of additional pods. Significant amounts of storage can be consolidated underground in a relatively small footprint, which will tend to be significantly smaller than the equivalent storage volume using above-ground storage tanks.

Figure 15:
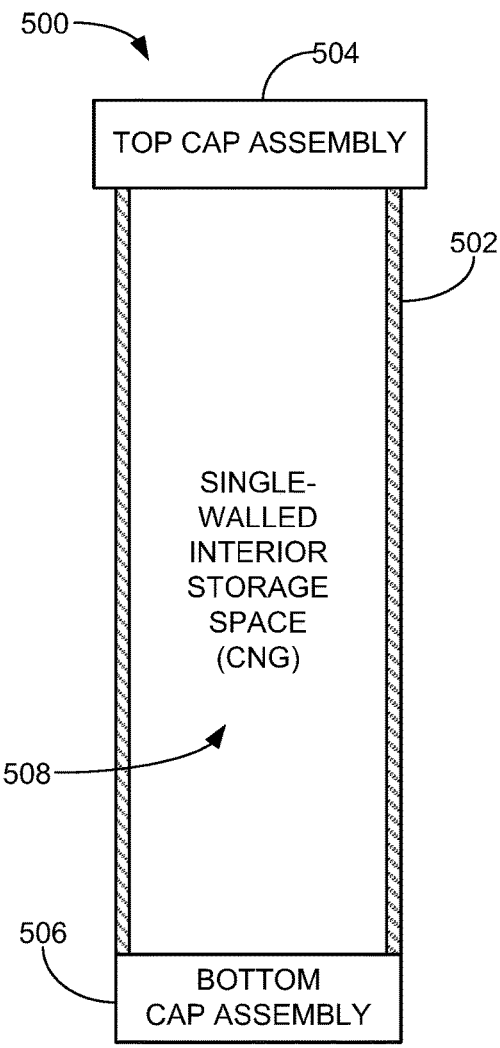
FIG. 15 is a schematic representation of a single walled, sub-surface storage container constructed and operated in accordance with some embodiments.

FIG. 15 shows a storage container 500 adapted to store a pressurized gas. The container 502 is characterized as a single walled container with a cylindrically shaped outer casing 502, a top cap assembly 504 and a bottom (lower) cap assembly 506. These elements can take various forms and material constructions. In one embodiment, the casing 502 is steel and has an overall outermost diameter (OD) of about 13 inches, in. The bottom cap assembly 506 may be sized to be substantially aligned with the OD of the casing 502.

The container 500 is thus provided with an interior storage space 508 adapted to store pressurized gas at up to a selected pressure. In this example, the container 500 is adapted to store compressed natural gas (CNG) at an internal pressure of up to about 5,000 psi. This is merely exemplary and is not limiting, as other gasses and pressures can be used depending on the construction and operation of the container.

Figure 16:
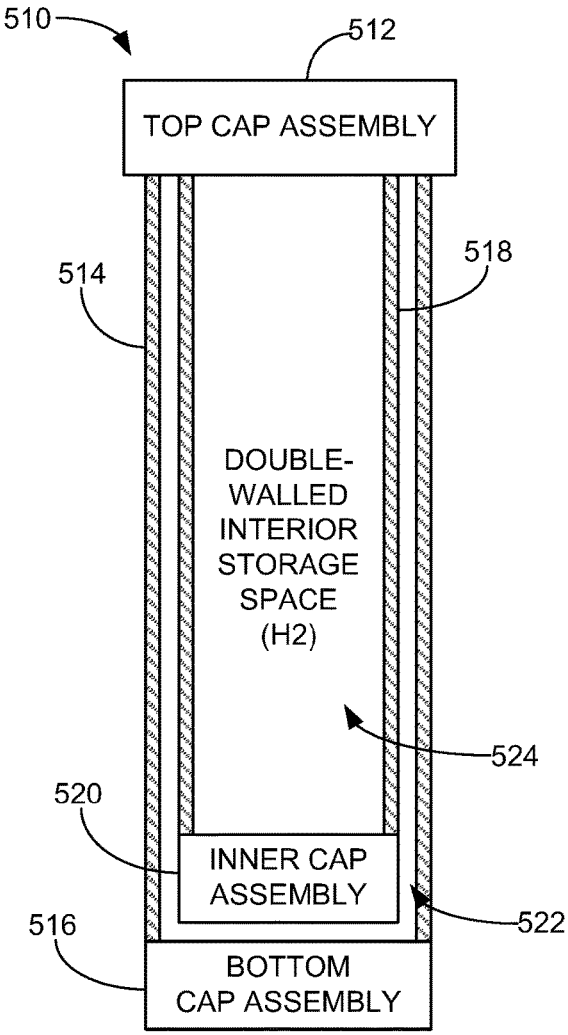
FIG. 16 is a schematic representation of a double walled, sub-surface storage container constructed and operated in accordance with further embodiments.

FIG. 16 shows a second storage container 510 similar to the container 500 in FIG. 15. In this case, the container 510 is characterized as a double-walled container with an outer casing 512, top cap assembly 514, bottom cap assembly 516, inner liner 518, inner cap assembly 520, and annulus (separation space) 522 between the inner liner 518 and outer casing 512. This defines an interior storage space 524 for the storage of high pressure gas. As before, the respective casing 512 and inner liner 518 may be formed of steel or other suitable materials, and the outer casing 512 may have the same nominal OD as the casing 502 in FIG. 15.

A fluid such as a non-compressible liquid can be placed into the annulus 522 to enable transfer of pressure from the interior storage space 524 to the outer casing 512. A suitable non-compressible fluid is propylene glycol, although other liquids can be utilized as desired. Corrosion inhibitors and gas reactive additives can be supplied in the fluid as desired. In this example, the interior storage space 524 is configured to store H2 at any suitable pressure, including an operational pressure of up to about 12,000 psi. As before, other gases and pressures can be utilized as desired.

Both of the storage containers 500, 510 are provided with suitable ports (not separately shown) as part of the associated cap assemblies 504, 514 to allow the introduction (supply) and withdrawal (delivery) of the associated gasses stored by the respective containers.

Figure 17:
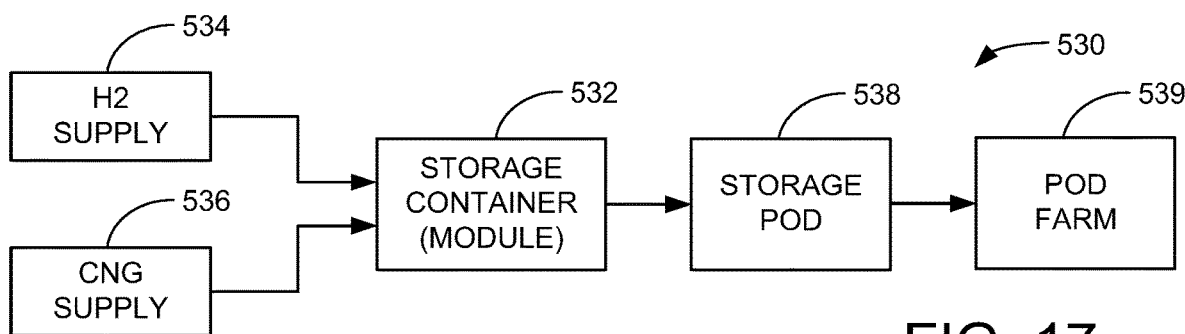
FIG. 17 is a functional representation of the grouping and use of containers such as in FIGS. 15-16 into storage pod and storage farm arrangements.

The storage containers 500, 510 can be used in a variety of different applications. FIG. 17 provides a functional block representation of a storage system 530 configured to store pressurized gas as the secondary fuel in the system 430.

In the present example, an array of storage containers is generally denoted at 532. The array may be formed of both double-walled and single-walled containers to supply either or both H2 and CNG on demand as required. While both H2 and CNG are shown, this is not required, as a single type of gas can be stored and dispensed.

The H2 is supplied to the double liner containers in the array 532 from a hydrogen source 534 (such as electrolyzer 476), and the CNG is supplied to the single liner containers in the array 532 from a CNG source 536 (such as distribution line 456). A first compressor can be used to provide the H2 at the desired pressure (in this case, about 12,000 psi). Similarly, a second compressor may be used to provide the CNG at the desired pressure (in this case, about 5,000 psi). Other storage pressures can be used.

A storage pod 538 is made up of a plural number M of the storage containers 532. Examples discussed below provide seven containers per pod (M=7), but other numbers can be used. As discussed previously, a pod farm 539 is made up of a plural number N of the pods. Any number of pods can be used, but the number N may be dozens, hundreds, or even more as required. The pod farm 539 may correspond to the pod farms discussed above in FIGS. 6 and 13.

Returning briefly to FIG. 16, it will be noted that the dual liner container 510 can alternatively be adapted for storage of liquid secondary fuel at a cryogenic temperature, provided the annulus 522 is configured to accommodate a vacuum (so that the container operates as a vacuum flask). Liquid natural gas (LNG) has a boiling point of −259 F (−162 C). Liquid hydrogen (LH2) has a boiling point of −418 F (−250 C). Suitable thermal cycling equipment can be incorporated to convert the stored natural gas and/or hydrogen to liquid form. While energy intensive, this significantly increases the amount of secondary fuel that can be stored in the pod farm 539. When ready for use, the liquid is expanded and returned to gaseous form for combustion by the gas turbine (or other power plant mechanism). It will be appreciated that internal storage pressures of cryogenically cooled liquid fuel may be significantly less than the equivalent mass stored in gas form.

Figure 18:
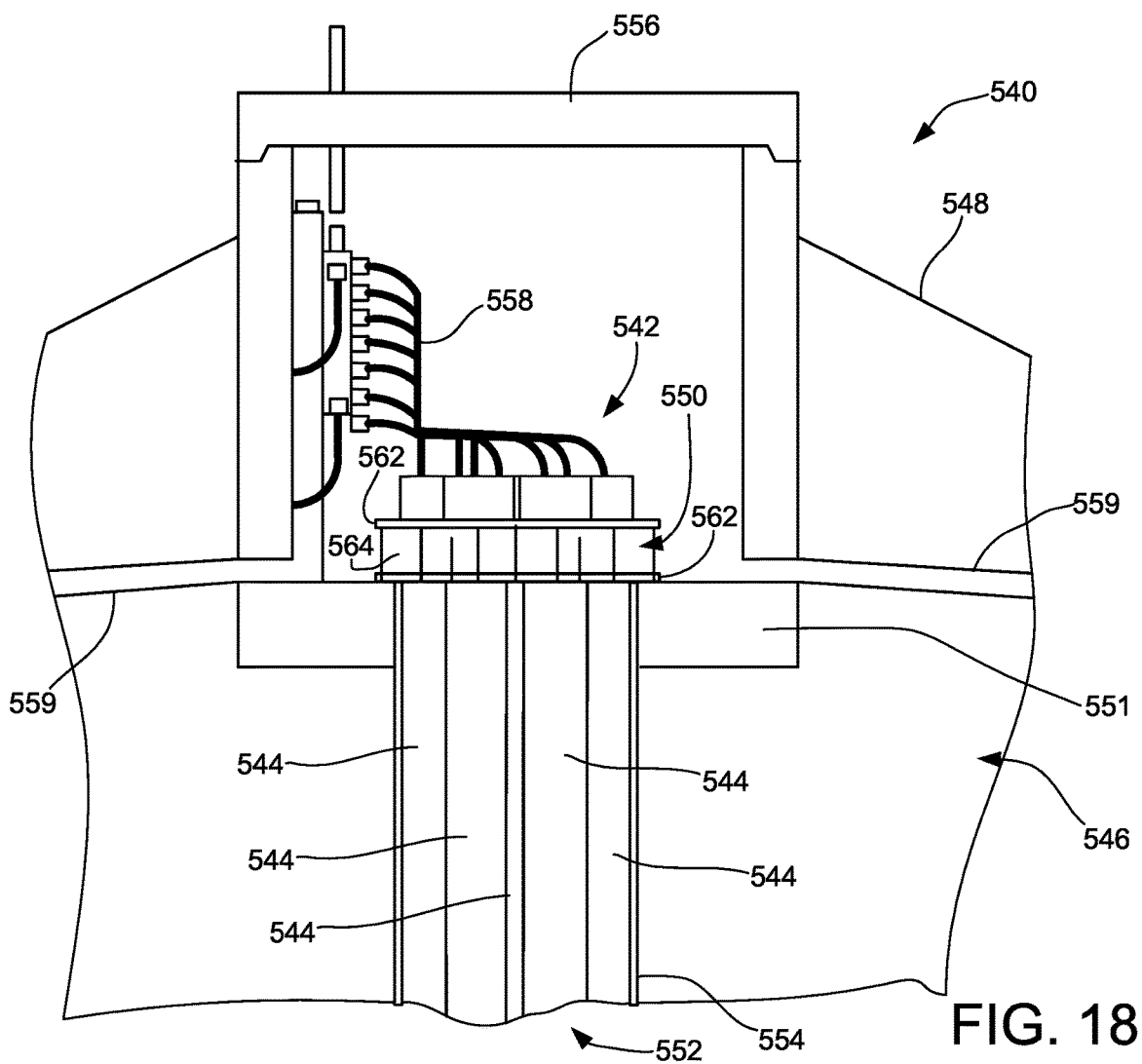
FIG. 18 shows aspects of a selected storage pod from FIG. 17 in some embodiments.
Figure 19A:
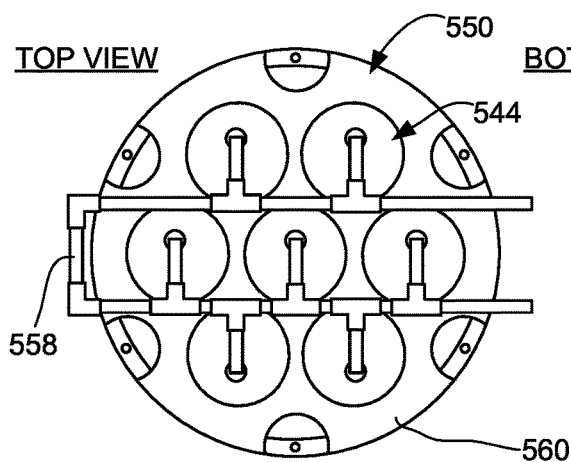
FIGS. 19A and 19B are top and bottom views of aspects of the selected storage pod from FIG. 18.

FIG. 18 shows aspects of a sub-surface storage system 540 that may be utilized as part of the system 530 of FIG. 17. The system 540 includes one or more pods 542 of storage containers 544 that extend downwardly into a sub-surface formation 546 from near a surface level 548. FIG. 19A shows a top plan view (looking down) of the pod 542 and FIG. 5B shows a bottom plan view (looking up) for the pod 542.

The pod 542 includes a total of seven (7) of the storage containers 544 in a circular honeycomb arrangement. The storage containers 544 all have the same nominal outer dimensions and may be single-walled or double-walled as described above. A support plate assembly 550 supports an upper portion of each of the containers 544 and spans an opening in a concrete pad 551 down into a bore 552. The bore 552 is lined with a casing 554, such as a length of corrugated pipe that has been concreted in place. While not limiting, in some embodiments the bore 552 may have an overall diameter of about 60 in., the plate 550 has a slightly larger OD of about 62 in., and the corrugated pipe casing 554 has an inner diameter (ID) of about 54 inches. In this way, the containers slidingly fit within the bore in close, non-contacting relation (about 1 in. apart). Other sizes and configurations can be used.

Other elements of the storage system 140 include a protective bunker housing 556 that can be made of pre-formed concrete and lowered/raised in place; internal piping, valving and controls (shown generally at 558), and various drainage and plumbing conduits 559.

Figure 19B:
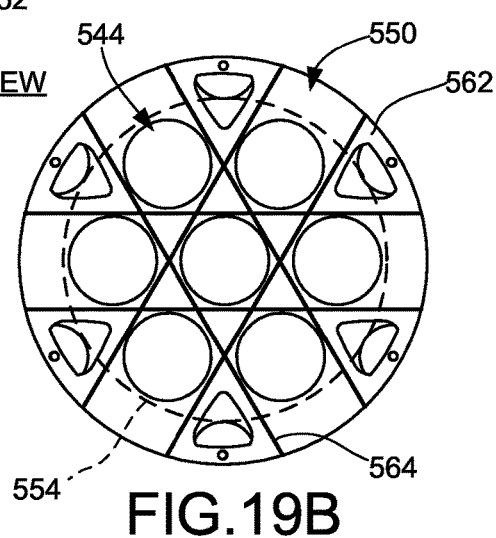

With further reference to FIGS. 19A and 19B, the support plate assembly 550 includes an upper (top) horizontal plate 560, a lower (bottom) horizontal plate 562, and vertically extending support flanges 564. While not limiting, in at least some embodiments the top cap assembly (see 504, 512 in FIGS. 15-16) of each container 544 is larger in diameter than the outermost diameter of the body portions of the containers (502, 514).

This allows each body portion to be inserted downwardly through corresponding apertures in the top and bottom plates 560, 562, and the top cap assembly rests on the top plate 560 as shown. The containers 544 thus hang in the bore 552, which can remain open (e.g., not backfilled with concrete, etc.). As desired, the containers can further be supported by intermediary supports (not shown) and secured to the support plate assembly 550 using suitable attachment mechanisms (also not shown).

FIG. 20 shows aspects of another pod farm 570 similar to the pod farms described previously. The pod farm 570 is shown to have 36 (9×4) pods 572, with each pod 572 having seven (7) storage containers (modules) 574. Other arrangements can be used. While not shown, interconnections and associated control elements (e.g., 558, FIGS. 18-19A) can be routed between and among the pods 572 to provide larger combined storage spaces for the secondary fuel as well as flow paths and mechanisms to store, migrate, blend and deliver the secondary fuel.

The pods 572 can be preassembled and shipped to the installation site as generally represented in FIG. 21 using a suitable transport vehicle such as a flat-bed tractor trailer rig 576. In this case, intermediary support plates 578 can be used as temporary support mechanisms to support the containers 574 while the containers are oriented in a horizontal position for transport. However, in other embodiments one or more of the support plates 578 can be used to support the containers 574 vertically within the well bore 552 as described previously.

FIG. 22A shows a crane rig 580 that can be used to raise and lower a selected container 574A, such as from the transport rig 576 in FIG. 10. In this case, once the storage pod is shipped to the installation site, the crane rig 580 can individually lower the containers 200 into the bore through the installed support plate 550. Similarly, an existing storage container can be removed from a pod for repair or replacement.

Alternatively, FIG. 22B shows the crane rig 580 lowering the entire storage pod 572 into the bore 522. In this case, the support plates 578 can be removed prior to insertion of the pod into the bore, thereby allowing the individual storage containers (such as 574A in FIG. 22A) to be removed and replaced as needed.

It should be noted that the so-called "Full Bore and Removable" design allows the storage pod to be fully assembled and shipped to an existing "built for purpose" inspection facility where larger and more sophisticated equipment capable of detecting smaller material defects may be used. This is especially true for hydrogen embrittlement applications. Such inspections can be easily and efficiently carried out by this design.

Figure 23:
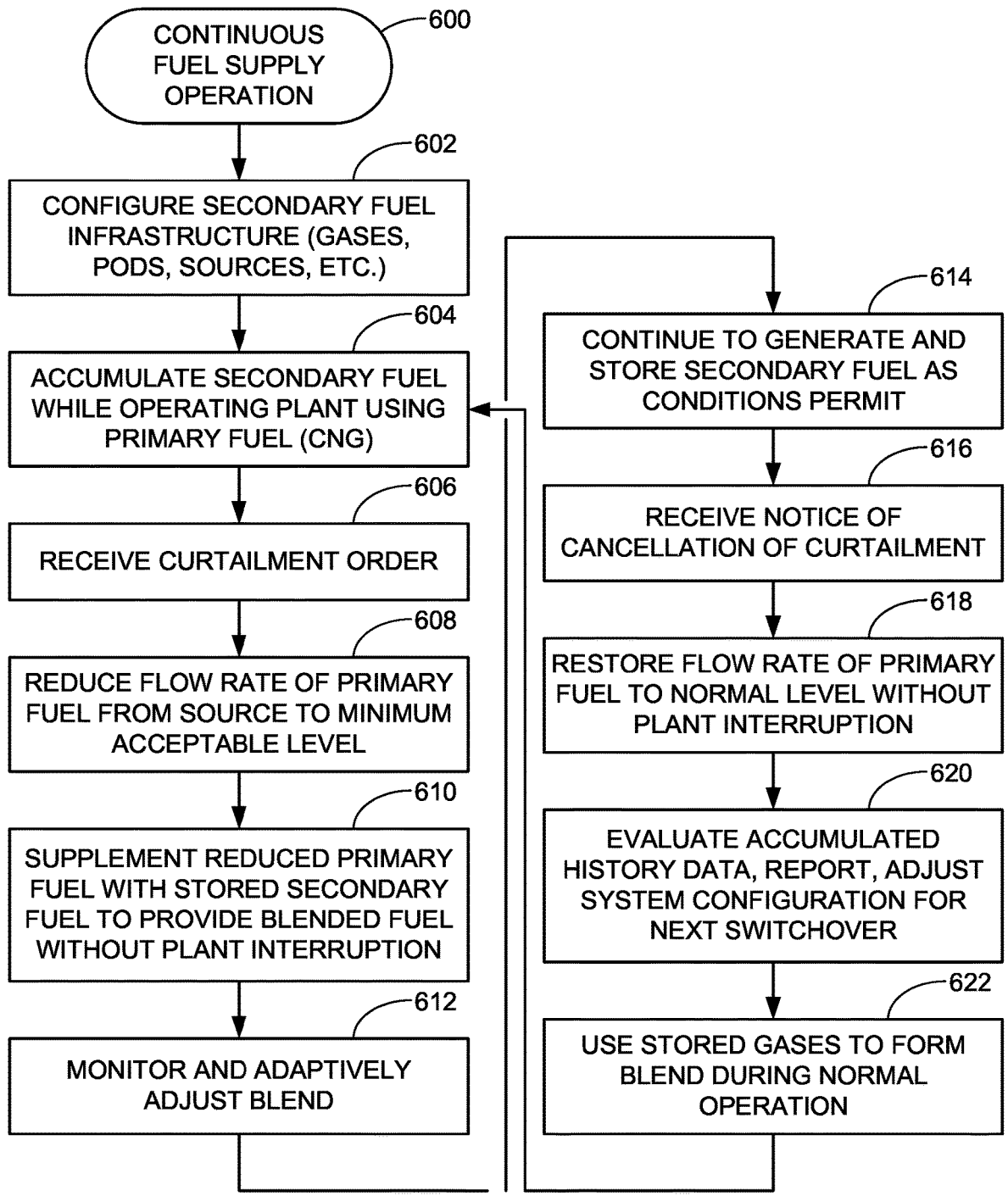
FIG. 23 is a flow chart for a CONTINUOUS FUEL SUPPLY OPERATION routine carried out in accordance with various embodiments.

FIG. 23 provides a flow chart for a CONTINUOUS FUEL SUPPLY OPERATION routine 600 to illustrate various steps that can be carried out in accordance with the foregoing discussion. The routine 600 is merely illustrative and is not limiting, so that the various steps may be appended, modified, omitted, performed in a different order, etc. In the present case, it will be contemplated that the routine 600 is carried out for a system configuration such as discussed above in FIGS. 11 and 13 for a gas turbine natural gas power plant. In this case, the secondary fuel is arranged to store approximately ⅔rds (66.67%) natural gas and approximately ⅓rd (33.33%) H2.

At step 602, the secondary fuel storage infrastructure is initially specified, configured and installed. This may include various steps such as determining the total amount of sub-surface storage (such as in MCF), determining the total number of pods to provide this overall storage, and performing the necessary construction steps to drill the bores and install and plumb the pods into the pod farm.

It will be recalled that the system is modular, so that if in the future additional storage is desired, this can be easily added by drilling additional bores and installing additional pods. The well bores may be caisson type holes (e.g., about 50 feet deep and about 6 feet across) which are easily and inexpensively formed. It is noted that ground temperatures at these depths are relatively constant independently of the outside ambient temperature, so that the system will remain stable and at substantially constant storage temperatures and pressures at all times.

Additional operations that may be carried out during step 602 include the installation of the necessary source infrastructure elements to generate the respective gases for storage as secondary fuel. This may include additional piping and control elements to direct a portion of the natural gas to a compressor and other elements (see FIG. 10) to store the natural gas at the desired storage pressure, the installation of wind, solar and/or other green energy sources to power the hydrolyzer, etc.

Once installed, the system continues at step 604 where the secondary fuel (e.g., H2 and CNG) are accumulated and stored within the storage farm. During this accumulation, the plant (e.g., turbine 458) operates using the primary fuel (CNG) from the primary fuel source (e.g., transmission pipeline 410/454).

A curtailment order is received at step 606. For purposes of the present discussion, this may be a result of a severe weather storm in which insufficient capacity exists within the overall system for the CNG supplier 426 to continue to supply natural gas to the power plant at the normally required amount. The order may be to completely halt further draws of natural gas from the pipeline, or depending on the negotiated agreement, to significantly reduce the amount of natural gas that is drawn from the pipeline.

As shown by step 608, the controller 450 operates to throttle the inlet natural gas to a minimum level acceptable to the system. This minimum acceptable level may be based on pressures, flow rates or other metrics to maintain the system at an acceptable curtailment level. The controller 450 further introduces a flow of the secondary fuel from the storage farm to provide a blended fuel for the gas turbine at step 610 to provide uninterrupted operation and continued generation of electricity at the current level. It will be noted that the blended fuel may be 100% natural gas or some constituent percentage of natural gas and another gas such as H2. It is contemplated that the gas turbine can accommodate the change to the blended fuel without the need to interrupt operation.

Step 612 shows the controller 450 operative to monitor the ongoing system performance and make adjustments to the system, including adjusting the blend based on demand, fuel availability and other factors.

As discussed previously, in situations where it is feasible to bring the renewable green energy sources back online (e.g., wind, solar, etc.), these elements can be utilized to continue to generate H2 (and O2 as required) for continued storage. It is contemplated that the renewable energy sources will not generate H2 at a sufficient rate to match the rate at which the H2 is being consumed (although this is possible in some circumstances), but this concurrent generation of additional secondary fuel will at least extend the time frame over which the pod farm can continue to supply fuel to the plant.

At some point the curtailment order will be cancelled, as indicated at step 616. At this point the CNG supplier has restored sufficient service capacity that the power plant can resume normal operation. It is noted that, depending on the circumstances, there is no immediate need for the power plant to switch back to 100% primary fuel, which provides further flexibility in operations.

Nonetheless, the decision is ultimately made at step 618 to restore the flow rate of the primary fuel back to the original normal level (including a normally applied pressure and flow rate) to the plant. This switching over is once again carried out by the controller 450 in adjusting the valving arrangements and other system elements to return the system to normal operation.

As shown by step 620, various post event actions can be taken including accumulating and analyzing data, generating reports, and making adjustments to the system in anticipation of the next exception event. Any number of adaptive adjustments can be made including changing the amount of total storage, adjusting secondary fuel ratios and generation mechanisms, changing storage pressures, and so on.

Finally, as shown by step 622, the secondary storage system can further be used during normal operation to supplement the ongoing operation of the gas turbine, such as by the use of a blended fuel with constituent elements (H2, O2, etc.) added to the natural gas during primary burning. The routine 600 thus returns to step 604 for the replenishment of the secondary fuel while anticipating the next curtailment order or other exception event that reduces or temporarily eliminates the availability of the primary fuel.

The assorted embodiments of an energy supply, storage, and blending system, described herein, provides intelligent storage of gases that can be utilized to generate electricity and the intelligent blending of fuels to optimize operational performance and cost. The storage section can provide dynamic volumes and pressures for gas storage that can mitigate and/or prevent material embrittlement as well as maintain optimal supply of gases for blending and power generation purposes. The ability to interchange sleeves of a gas storage vessel further combats embrittlement without incurring large costs associating with replacing the entirety of a vessel. Alternatively, the ability to replace an entire storage section, or storage pod, are available. The operation of the blend module provides intelligent adaptations to changing cost, demand, supply, and operational efficiencies through the dynamic fuel ratio selection.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   using natural gas from an infrastructure pipeline as a primary fuel to generate electrical power via a power generation mechanism which uses the natural gas at a selected flow rate and a selected pressure;
   accumulating a secondary fuel in a plurality of sub-surface storage pods adjacent the power generation mechanism;
   detecting an exception event that reduces an availability of the natural gas from the infrastructure pipeline to a level below the selected flow rate and the selected pressure;
   throttling subsequent flow of the natural gas from the infrastructure pipeline so that the natural gas continues to flow to the power generation mechanism from the infrastructure pipeline at a reduced flow rate while maintaining an inlet pressure at the infrastructure pipeline at or above a selected required pressure threshold; and
   blending the subsequent flow of the natural gas at the reduced flow rate with the secondary fuel to output a blended fuel that is supplied at the selected flow rate and selected pressure to maintain steady-state operation of the power generation mechanism without an interruption of electrical power output therefrom.

2. The method of claim 1, wherein the power generation mechanism comprises a gas turbine coupled to an electrical generator.

3. The method of claim 1, wherein the secondary fuel comprises natural gas.

4. The method of claim 3, wherein the natural gas is accumulated from the infrastructure pipeline during a period of reduced demand by the power generation mechanism.

5. The method of claim 1, wherein the natural gas is transported from the infrastructure pipeline through a meter and valve assembly to a local distribution pipeline coupled to the power generation mechanism, and wherein the secondary fuel comprises natural gas that is directed from the local distribution pipeline to a compressor which compresses the natural gas for storage in each of a plurality of storage containers of the storage pods.

6. The method of claim 5, wherein the secondary fuel further comprises hydrogen (H2) gas which is compressed and stored in a second plurality of storage containers of the storage pods.

7. The method of claim 5, wherein a controller circuit operates to adjust the valve assembly to throttle the natural gas from the infrastructure pipeline to the local distribution pipeline at the reduced flow rate.

8. The method of claim 1, wherein the secondary fuel comprises hydrogen and natural gas each stored in separate storage containers at different respective storage pressures.

9. The method of claim 1, wherein the secondary fuel is liquified using a cryogenic liquifying process.

10. The method of claim 1, wherein the storage pods are arranged as a storage farm within an array of well bores that extend from a ground level into a sub-surface formation.

11. The method of claim 1, wherein the secondary fuel comprises H2 and the method further comprises:
    using at least a selected one of a solar panel array or a windmill to generate renewable sourced electricity;
    using the renewable sourced electricity to power an electrolyzer to generate a stream of H2 gas; and
    compressing the stream of H2 gas to a final storage pressure of at least 10,000 psi.

12. The method of claim 1, further comprising providing the blended fuel with a first ratio of H2 to natural gas, and subsequently adjusting the blended fuel to a different, second ratio of H2 to natural gas.

13. The method of claim 1, wherein the reduced flow rate is a first reduced flow rate and the blended fuel is a first blended fuel at a first ratio of the primary fuel to the secondary fuel, and wherein the method further comprises:
    subsequently adjusting the throttling of the natural gas to a second reduced flow rate while maintaining the inlet pressure at the infrastructure pipeline at or above the selected required pressure threshold, the second reduced flow rate greater than the first reduced flow rate and less than the selected flow rate; and blending the subsequent flow of the natural gas at the second reduced flow rate with the secondary fuel to output a second blended fuel at a different, second ratio of the primary fuel to the secondary fuel and at the selected flow rate and selected pressure to continue steady-state operation of the power generation mechanism without an interruption of electrical power output therefrom.

14. The method of claim 1, wherein the exception event comprises receipt of a curtailment order by an authority associated with the infrastructure pipeline to reduce an amount of natural gas drawn from the infrastructure pipeline to a level insufficient to continue operation of the power generation mechanism, the curtailment order issued responsive to a winter storm.

15. The method of claim 1, wherein the reduced flow rate of the natural gas is 25% or less than the selected flow rate.

16. An apparatus comprising:
a storage farm comprising a plurality of sub-surface storage pods configured to accumulate a secondary fuel; and
a controller circuit coupled to the storage farm configured to, responsive to detection of an exception event that reduces an availability of natural gas from an infrastructure pipeline to serve as a primary fuel for a power generation mechanism at a selected flow rate and a selected pressure, throttle subsequent flow of the natural gas from the infrastructure pipeline so that the natural gas continues to flow to the power generation mechanism from the infrastructure pipeline at a reduced flow rate while maintaining an inlet pressure at the infrastructure pipeline at or above a selected required pressure threshold, the controller circuit further configured to blend the subsequent flow of the natural gas at the reduced flow rate with the secondary fuel from the storage farm to output a blended fuel that is supplied at the selected flow rate and selected pressure to maintain steady-state operation of the power generation mechanism without an interruption of electrical power output therefrom.

17. The apparatus of claim 16, wherein the secondary fuel comprises natural gas stored in the storage farm from the infrastructure pipeline.

18. The apparatus of claim 16, wherein the secondary fuel comprises hydrogen (H2) and the apparatus further comprises an electrolyzer which processes water to form the H2, and a compressor which compresses the H2 to a selected storage pressure.

19. The apparatus of claim 18, wherein the electrolyzer is powered by a renewable energy source comprising at least a selected one of a solar panel or a windmill, the electrolyzer operative to generate the H2 for storage during the blending of the primary fuel with the secondary fuel.

20. The apparatus of claim 16, wherein the reduced flow rate is a first reduced flow rate, wherein the blended fuel is a first blended fuel at a first ratio of the primary fuel to the secondary fuel, wherein the controller is further configured to subsequently adjust the throttling of the natural gas to a second reduced flow rate while maintaining the inlet pressure at the infrastructure pipeline at or above the selected required pressure threshold, the second reduced flow rate greater than the first reduced flow rate and less than the selected flow rate, and wherein the controller is further configured to blend the subsequent flow of the natural gas at the second reduced flow rate with the secondary fuel to output a second blended fuel at a different, second ratio of the primary fuel to the secondary fuel and at the selected flow rate and selected pressure to continue steady-state operation of the power generation mechanism without an interruption of electrical power output therefrom.

\* \* \* \* \*